United States Patent
Solomentsev et al.

(10) Patent No.: US 12,487,363 B2
(45) Date of Patent: Dec. 2, 2025

(54) LiDAR SYSTEMS AND METHODS DETERMINING DISTANCE TO OBJECT FROM LiDAR SYSTEM

(71) Applicant: YANDEX SELF DRIVING GROUP LLC, Moscow (RU)

(72) Inventors: Dmitry Valentinovich Solomentsev, Moscow (RU); Andrey Viktorovich Golikov, Moscow (RU); Nikolay Evgenevich Orlov, Sarapul (RU)

(73) Assignee: Y.E. Hub Armenia LLC, Yerevan (AM)

( * ) Notice: Subject to any disclaimer, the term of this patent is extended or adjusted under 35 U.S.C. 154(b) by 1252 days.

(21) Appl. No.: 17/239,264

(22) Filed: Apr. 23, 2021

(65) Prior Publication Data
US 2021/0333407 A1    Oct. 28, 2021

(30) Foreign Application Priority Data
Apr. 23, 2020  (RU) .......................... RU2020114527

(51) Int. Cl.
*G01C 3/08*   (2006.01)
*G01S 7/484*  (2006.01)
(Continued)

(52) U.S. Cl.
CPC ............ *G01S 17/931* (2020.01); *G01S 7/484* (2013.01); *G01S 7/486* (2013.01); *G01S 17/42* (2013.01)

(58) Field of Classification Search
CPC ........ G01S 17/931; G01S 7/484; G01S 7/486; G01S 17/42; G01S 7/4866; G01S 17/93; G01S 17/18
See application file for complete search history.

(56) References Cited

U.S. PATENT DOCUMENTS 10,059,342 B2   8/2018  Ricci
2015/0116695 A1 4/2015  Bartolome et al.
(Continued)

FOREIGN PATENT DOCUMENTS

CN   108508433 A    9/2018
KR   101978608 B1   5/2019
WO   2019199475 A2  10/2019

OTHER PUBLICATIONS

Russian Search Report dated Jan. 27, 2022 issued in respect of the counterpart Russian Patent Application No. RU 2020114527.

*Primary Examiner* — Samantha K Nickerson
(74) *Attorney, Agent, or Firm* — BCF LLP

(57) ABSTRACT

The disclosed systems, and methods are directed to determining distance to an in-use object from a LiDAR system, the systems and methods comprising: acquiring a series of discrete digital values representative of an optical return pulse, accessing, a pre-populated library stored in a memory for retrieving a resolution parameter, the accessing including: determining, similarity parameters between (i) the series of discrete values and (ii) respective ones of the list of template pulse profiles, a given similarity parameter being determined between (i) the series of discrete values and (i) a respective template pulse profile from the list of template pulse profiles; retrieving, from the library, at least the respective resolution parameter of the template pulse profile having a highest similarity parameter; and using, the respective resolution parameter for determining the distance of the in-use object from the LiDAR system.

20 Claims, 11 Drawing Sheets

(51) Int. Cl.
    *G01S 7/486*     (2020.01)
    *G01S 17/42*     (2006.01)
    *G01S 17/931*     (2020.01)

(56) References Cited

U.S. PATENT DOCUMENTS

| | | |
|---|---|---|
| 2017/0068247 A1 | 3/2017 | Hara |
| 2018/0113160 A1 | 4/2018 | Warburton et al. |
| 2019/0049586 A1 | 2/2019 | Bronstein et al. |
| 2019/0129031 A1 | 5/2019 | Qiu et al. |
| 2019/0368882 A1* | 12/2019 | Wheeler ............ G01C 21/3635 |

* cited by examiner

| Type of material of the test object | Distance (cm) | Template pulse profiles 600 | Resolution Parameter ||||||| Normalized average power of test reflected optical pulse (W) |
|---|---|---|---|---|---|---|---|---|---|
| | | | Start of optical pulse distance compensation (cm) | Start of optical pulse time compensation (ns) | Peak of optical pulse distance compensation (cm) | Peak of optical pulse time compensation (ns) | End of optical pulse distance compensation (cm) | End of optical pulse time compensation (ns) | |
| Plastic | 45 | ☐ | 0 | 0 | 0 | 0 | 0 | 0 | .68 |
| | 46 | ☐ | -14 | -.933 | -6.5 | -.433 | +1 | +.067 | .65 |
| | 47 | ☐ | -13 | -.867 | -5.5 | -.367 | +2 | +1.33 | .63 |
| | 48 | ☐ | -12 | -.8 | -4.5 | -.3 | +3 | +.200 | .60 |
| Metal | 45 | ☐ | 0 | 0 | 0 | 0 | 0 | 0 | .78 |
| | 46 | ☐ | -14 | -.933 | -6.5 | -.433 | +1 | +.067 | .75 |
| | 47 | ☐ | -13 | -.867 | -5.5 | -.367 | +2 | +1.33 | .73 |
| | 48 | ☐ | -12 | -.8 | -4.5 | -.3 | +3 | +.200 | .71 |
| Glass | 45 | ☐ | 0 | 0 | 0 | 0 | 0 | 0 | .90 |
| | 46 | ☐ | -14 | -.933 | -6.5 | -.433 | +1 | +.067 | .85 |
| | 47 | ☐ | -13 | -.867 | -5.5 | -.366 | +2 | +1.33 | .83 |
| | 48 | ☐ | -12 | -.8 | -4.5 | -.3 | +3 | +.200 | .80 |

Figure 11

LiDAR SYSTEMS AND METHODS DETERMINING DISTANCE TO OBJECT FROM LiDAR SYSTEM

CROSS-REFERENCE

The present application claims priority to Russian Patent Application No. 2020114527, entitled "Lidar Systems and Methods Determining Distance to Object From Lidar System", filed Apr. 23, 2020, the entirety of which is incorporated herein by reference.

FIELD OF TECHNOLOGY

The present technology relates to Light Detection and Ranging (LiDAR) systems, and more specifically, to LiDAR systems determining distance to an object from the LiDAR system.

BACKGROUND

Several computer-based navigation systems that are configured for aiding navigation and/or control of vehicles have been proposed and implemented in the prior art. These systems range from more basic map-aided localization-based solutions—i.e. use of a computer system to assist a driver in navigating a route from a starting point to a destination point; to more complex ones such as computer-assisted and/or driver-autonomous driving systems.

Some of these systems are implemented as what is commonly known as a "cruise control" system. Within these systems, the computer system boarded on the vehicles maintains a user-set speed of the vehicle. Some of the cruise control systems implement an "intelligent distance control" system, whereby the user can set up a distance to a potential car in front (such as, select a value expressed in a number of vehicles) and the computer system adjusts the speed of the vehicle at least in part based on the vehicle approaching the potential vehicle in front within the pre-defined distance. Some of the cruise control systems are further equipped with collision control systems, which systems, upon detection of the vehicle (or other obstacle) in front of the moving vehicle, slow down or stop the vehicle.

Some of the more advanced systems provide for a fully autonomous driving of the vehicle without direct control from the operator (i.e. the driver). These autonomously driven vehicles include systems that can cause the vehicle to accelerate, brake, stop, change lane and self-park.

One of the main technical challenges in implementing the above systems is the ability to detect an object located around the vehicle. In one example, the systems may need the ability to detect the vehicle in front of the present vehicle (the present vehicle having the system onboard), which vehicle in front may pose a risk/danger to the present vehicle and may require the system to take a corrective measure, be it braking or otherwise changing speed, stopping or changing lanes.

Other technical challenges with the implementation of the above systems include de-calibration of sensors and other components that gather data about the surroundings of the vehicle. A plethora of factors, including weather, road conditions, driving habits, for example, influence sensors and other components over time, requiring calibration in order to ensure that data is accurately captured and correctly used for controlling vehicles.

In LiDAR-based systems, objects around the vehicle can be detected by transmitting beams of light towards a region of interest, and measuring reflected light beams with a detector. Lasers emitting pulses of light within a narrow wavelength are often used as the light source. The position and distance of the object can be computed using time-of-flight calculations of the emitted and detected light beam. By computing such positions as "data points", a digital multi-dimensional representation of the surroundings can be generated.

In certain conventional LiDAR-based systems, in order compute distance of the object, the reflected light beams are converted to the corresponding electrical pulses. The electrical pulses are then converted to discrete digital signals. Typically, this conversion involves analog-to-digital converters (ADCs) having a predetermined resolution. By way of example, if an associated ADC is being operated with a clock pulse having a period of 1 nanosecond (ns) (in other words the clock frequency is 1 Gigahertz (GHz)), then the respective ADC may have a precision of ±15 centimeter (cm) while measuring the distance. Even after operating the ADC at such a high speed, the precision offered might underperform when the conventional LiDAR-based systems is incorporated into vehicles such as self-driving cars (SDCs).

These challenges may be exacerbated by certain proposed enhancements to existing LiDAR-based systems. Such enhancements include the deployment of ADC operated at even higher sampling rate to sample the electrical pulses corresponding to the reflected light beams. Such enhancements potentially strain the hardware and software processing resources associated with the LiDAR-based systems.

Generally, there exist several methods and systems for determining distance to an object from the LiDAR system. For example, "US 2018113160 A1", published on Apr. 26, 2018 and currently assigned to XIA LLC, describes a digital processing technique for measuring a characteristic of a digitized electronic signal pulse, particularly including its time of arrival and/or maximum. The technique is particularly suited for in-line implementation in a field programmable gate array or digital signal processor. For each detected pulse, one or more ratios are created from values of the pulse above baseline, obtained from regions of the pulse where the values change as its arrival time offset changes, and the ratio or ratios are used as variables in a reference table or equation to generate the value of the desired characteristic. The table or equation is created beforehand by using a secondary technique to study pulses of the type being measured, to establish the relationship between the ratio value or values and the desired characteristic, and to codify that relationship in the reference table or equation. Time resolutions of 2-3% of the sampling interval are demonstrated.

"US 20190129031 A1", published on May 2, 2019 and currently assigned to SHENZHEN SUTENG JUCHUANG TECHNOLOGIES LTD. CO., describes a pulse laser ranging system and method employing a time domain waveform matching technique. The system comprises a software part and a hardware part. The hardware part comprises an optical collimation system, an FPGA, a filter, a photoelectric conversion system, an analog amplifier circuit, a laser transmitter, a signal combination system, an ADC sampling system and a narrow pulse laser transmitting circuit. When transmitting a control signal to control laser transmission, the FPGA sends a time reference pulse to the signal combination system. The signal combination system integrates the time reference pulse with a fixed amplitude analog echo signal to form an echo signal with a time reference. The echo signal with a time reference is quantified into a digital detection signal in the ADC sampling system. The digital detection signal is sent to the FPGA to undergo data analysis. The software part is used to perform time domain waveform matching analysis to obtain a ranging result. The ranging result is output by the FPGA.

"KR 101978608 B1", published on May 14, 2019 and currently assigned to UNIV SEJONG IND ACAD COOP FOUD., describes a high-resolution digital domain lidar system. According to the present invention, the high-resolution digital domain lidar system comprises: a microcontroller repeatedly outputting a trigger; a transmitting unit generating and transmitting lidar signals and enable signals of a lidar when a trigger is input; and a receiving unit receiving the lidar signals reflected from a target, operating a signal processing module when receiving the enable signals to count the number (N) of phases and the number (M) of rising edges of a clock, sequentially receiving clock signals of a corresponding phase as many as the number of phases through a phase-locked loop (PLL), matching, with the lidar signals, points of time corresponding to the rising edges of the clock signals to perform digital sampling, storing the N×M number of lidar signal data digitally sampled, comparing similarity between the stored lidar signal data and the transmitted lidar signals to calculate correlation values, detecting timing points from the calculated values, and transmitting the detected timing points to the microcontroller. As described above, according to the present invention, high-speed clocks are generated by using the PLL and an equivalent time sampling (ETS) method, and digital sampling is performed by using the generated clocks, such that high-resolution lidar data can be processed in a digital domain.

SUMMARY

Therefore, there is a need for systems which avoid, reduce or overcome the limitations of the prior art.

Developers of the present technology have identified drawbacks of prior art solutions.

Developers have identified that in providing LiDAR systems which can scan with a higher resolution, consideration must also be given to the associated hardware requirement. For example, if the LiDAR system is expected to provide a spatial resolution on 1 cm, the associated operating clock frequency should be around 15 GHz. To this end, various hardware components such as processor, analog-to-digital convertors and the like should operate at this high speed clock and thereby increasing the operational and hardware cost of such LiDAR system.

Broadly, developers of the present technology have devised a LiDAR system that can provide an increased spatial resolution compared to conventional LiDAR systems without operating the LiDAR system at a very high clock frequency and hence using the standard hardware components, in certain embodiments. It is also contemplated that in other embodiments, developers of the present technology have devised a LiDAR system that can also provide an increased temporal resolution compared to conventional LiDAR systems without operating the LiDAR system at a vey high clock frequency and hence using the standard hardware components. In certain embodiments, the LiDAR system of the present technology populates a library with template pulse profiles and associated records. The LiDAR system then accesses the library to retrieve a resolution parameter in order to compute a distance between the LiDAR system of the present technology and an object.

In certain embodiments, advantages of the present technology include an increased capacity of the system in terms of spatial and temporal resolution. Also, the increased capacity of the system is achieved without compromising an expense and complexity of the system.

In accordance with a first broad aspect of the present technology, there is provided a computer-implemented method of determining distance to an in-use object from a LiDAR system, the in-use object being of a type, the type being one of a plurality of types of objects, the LiDAR system being communicatively coupled to an electronic device, the method executable by the electronic device, the method comprising: acquiring, by the electronic device, a series of discrete digital values, the series of discrete digital values being representative of an optical return pulse, the optical return pulse corresponding to an optical output pulse (i) having been emitted by the LiDAR system and (ii) having returned to the LiDAR system after contacting the in-use object; accessing, by the electronic device, a pre-populated library stored in a memory for retrieving a resolution parameter, the library including a list of template pulse profiles, a given one of the list of template pulse profiles being associated in the library with a respective test object, a respective resolution parameter, and a type of the respective test object from the plurality of types; the accessing including: determining, by the electronic device, similarity parameters between (i) the series of discrete values and (ii) respective ones of the list of template pulse profiles, a given similarity parameter being determined between (i) the series of discrete values and (i) a respective template pulse profile from the list of template pulse profiles; retrieving, by the electronic device from the library, at least the respective resolution parameter of the template pulse profile having a highest similarity parameter; and using, by the electronic device, the respective resolution parameter for determining the distance of the in-use object from the LiDAR system.

In some embodiments, the computer-implemented method, wherein the determining the similarity parameter comprises: comparing, by the electronic device, the series of discrete values against a totality of the given template pulse profile.

In some embodiments, the computer-implemented method, wherein the determining the similarity parameter comprises: employing, by the electronic device, a correlation method for determining the similarity parameter.

In some embodiments, the computer-implemented method, wherein the determining the similarity parameter comprises: employing, by the electronic device, a least mean square error method for determining the similarity parameter.

In some embodiments, the computer-implemented method, wherein the electronic device is communicatively coupled to a Self-Driving Car (SDC).

In some embodiments, the computer-implemented method, wherein the method further comprises: controlling, by the electronic device, operation of the SDC based on the distance of the in-use object.

In some embodiments, the computer-implemented method, wherein the retrieving at least the resolution parameter further comprises: retrieving, by the electronic device, the type of the respective test object of the template pulse profile having a highest similarity parameter, and wherein the controlling the operation of the SDC by the electronic device is further based on the type of the respective test object.

In some embodiments, the computer-implemented method, wherein the type of the in-use object is apriori unknown.

In some embodiments, the computer-implemented method, wherein the series of discrete digital values is generated by an analog-to-digital (ADC) converter having a pre-determined temporal resolution.

In some embodiments, the computer-implemented method, wherein the pre-determined temporal resolution is about 1 nanosecond.

In some embodiments, the computer-implemented method, wherein the method further comprises, prior to the acquiring the series of discrete digital values: populating, by the electronic device, the pre-populated library.

In some embodiments, the computer-implemented method, wherein the populating comprises: for a given test object of a given type, acquiring, by the electronic device, a respective template pulse profile of a test optical return pulse, the test optical return pulse corresponding to an test optical output pulse (i) having been emitted by the LIDAR system and (ii) having returned to the LIDAR system after contacting the given test object located at a pre-determined distance from the LIDAR system; determining, by the electronic device, the resolution parameter for the test optical return pulse based on the pre-determined distance; populating, by the electronic device, the library with a record for the respective template pulse profile, the record being indicative of (i) the respective template pulse profile, (ii) the given type of the given test object, and (iii) the resolution parameter.

In some embodiments, the computer-implemented method, wherein the resolution parameter is one of a temporal value and a distance value.

In some embodiments, the computer-implemented method, wherein the resolution parameter is the temporal value, and wherein the temporal value is a difference between (i) a moment in time corresponding to an actual peak value of the respective template pulse profile and (ii) a moment in time corresponding to a calculated peak value of the respective template pulse profile.

In some embodiments, the computer-implemented method, wherein the using the respective resolution parameter comprises: using, by the electronic device, the temporal value for determining a time of flight of the optical return pulse.

In some embodiments, the computer-implemented method, further comprising training a Machine Learning Algorithm to predict the highest similarity parameter based on the list of template pulse profiles and the associated records stored in the library.

In some embodiments, the computer-implemented method, further comprising training a Machine Learning Algorithm to predict the type of the test object based on the list of template pulse profiles and the associated records stored in the library In accordance with a second broad aspect of the present technology, there is provided an electronic device for determining distance to an in-use object from a LiDAR system, the in-use object being of a type, the type being one of a plurality of types of objects, the LiDAR system being communicatively coupled the electronic device, the electronic device configured to: acquire a series of discrete digital values, the series of discrete digital values being representative of an optical return pulse, the optical return pulse corresponding to an optical output pulse (i) having been emitted by the LiDAR system and (ii) having returned to the LiDAR system after contacting the in-use object; access a pre-populated library stored in a memory for retrieving a resolution parameter, the library including a list of template pulse profiles, a given one of the list of template pulse profiles being associated in the library with a respective test object, a respective resolution parameter, and a type of the respective test object from the plurality of types; the accessing including: determining similarity parameters between (i) the series of discrete values and (ii) respective ones of the list of template pulse profiles, a given similarity parameter being determined between (i) the series of discrete values and (i) a respective template pulse profile from the list of template pulse profiles; retrieving from the library, at least the respective resolution parameter of the template pulse profile having a highest similarity parameter; and use the respective resolution parameter for determining the distance of the in-use object from the LiDAR system.

In the context of the present specification, a "discrete digital values" broadly refers to a series of digital values generated by analog-to-digital convertor (ADC). Broadly speaking, the ADC may be configured to sample, quantize and encode the received signal/pulse. The encoded received signal/pulse may be referred to as discrete digital values. The nature of discrete digital values may include but are not limited to bipolar, polar, unipolar, non-return to zero (NRZ), return to zero (RZ), bi-phase or the like.

In the context of the present specification, an "optical output pulse" may also be referred to a transmitted optical pulse, such as a light pulse, that is generated by the radiation source and is directed downrange towards a region of interest (ROI). The output beam may have one or more parameters such as: pulse duration, pulse angular dispersion, wavelength, instantaneous power, photon density at different distances from light source, average power, pulse power intensity, pulse width, pulse repetition rate, pulse sequence, pulse duty cycle, wavelength, or phase etc. The optical output pulse may be unpolarized or randomly polarized, may have no specific or fixed polarization (e.g., the polarization may vary with time), or may have a particular polarization (e.g., linear polarization, elliptical polarization, or circular polarization).

In the context of the present specification, an "optical return pulse" may also be referred to as a reflected optical pulse, such as a light pulse, reflected from one or more objects in the ROI. By reflected is meant that at least a portion of the light pulse from the optical output pulse bounces off the one or more objects in the ROI. The output beam may have one or more parameters such as: time-of-flight (i.e., time from emission until detection), instantaneous power (e.g., power signature), average power across entire return pulse, and photon distribution/signal over return pulse period etc.

In the context of the present specification, a "radiation source" broadly refers to any device configured to emit radiation such as a radiation signal in the form of a beam. A radiation source includes, but is not limited to a light source configured to emit light beams. The light source may be a laser such as a solid-state laser, laser diode, a high power laser, or an alternative light source such as, a light emitting diode (LED)-based light source. Some (non-limiting) examples of the light source are Fabry-Perot laser diode, a quantum well laser, a distributed Bragg reflector (DBR) laser, a distributed feedback (DFB) laser, or a vertical-cavity surface-emitting laser (VCSEL). In addition, light source may emit light beams in differing formats, such as light pulses, continuous wave (CW), quasi-CW, and so on. In some non-limiting examples, the light source may include a laser diode configured to emit light at a wavelength between about 650 nm and 1150 nm. Alternatively, the light source may include a laser diode configured to emit light beams at a wavelength between about 800 nm and about 1000 nm, between about 850 nm and about 950 nm, between about 1300 nm and about 1600 nm or in between any other suitable range. Unless indicated otherwise, the term "about" with regard to a numeric value is defined as a variance of up to 10% with respect to the stated value.

In the context of the present specification, a "server" is a computer program that is running on appropriate hardware and is capable of receiving requests (e.g. from electronic devices) over a network, and carrying out those requests, or causing those requests to be carried out. The hardware may be implemented as one physical computer or one physical computer system, but neither is required to be the case with respect to the present technology. In the present context, the use of the expression a "server" is not intended to mean that every task (e.g. received instructions or requests) or any particular task will have been received, carried out, or caused to be carried out, by the same server (i.e. the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, "electronic device" is any computer hardware that is capable of running software appropriate to the relevant task at hand. In the context of the present specification, the term "electronic device" implies that a device can function as a server for other electronic devices, however it is not required to be the case with respect to the present technology. Thus, some (non-limiting) examples of electronic devices include self-driving unit, personal computers (desktops, laptops, netbooks, etc.), smart phones, and tablets, as well as network equipment such as routers, switches, and gateways. It should be understood that in the present context the fact that the device functions as an electronic device does not mean that it cannot function as a server for other electronic devices.

In the context of the present specification, the expression "information" includes information of any nature or kind whatsoever capable of being stored in a database. Thus information includes, but is not limited to visual works (e.g. maps), audiovisual works (e.g. images, movies, sound records, presentations etc.), data (e.g. location data, weather data, traffic data, numerical data, etc.), text (e.g. opinions, comments, questions, messages, etc.), documents, spreadsheets, etc.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, the words "first", "second", "third", etc. have been used as adjectives only for the purpose of allowing for distinction between the nouns that they modify from one another, and not for the purpose of describing any particular relationship between those nouns. Further, as is discussed herein in other contexts, reference to a "first" element and a "second" element does not preclude the two elements from being the same actual real-world element.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

These and other features, aspects and advantages of the present technology will become better understood with regard to the following description, appended claims and accompanying drawings where:

FIG. 11 illustrates a representation of a library populated by the processor, in accordance with various non-limiting embodiments of present technology;

DETAILED DESCRIPTION

Figure 1:
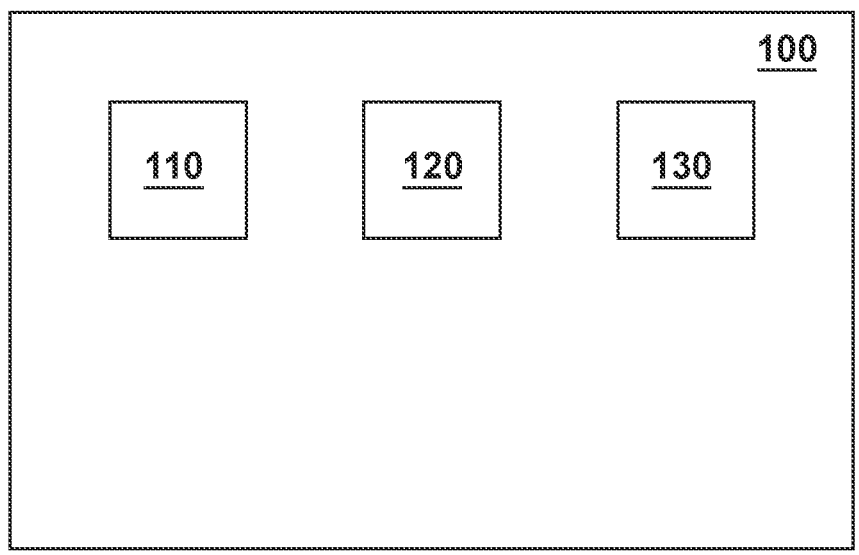
FIG. 1 depicts a schematic diagram of an example computer system for implementing certain embodiments of systems and/or methods of the present technology.

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudocode, and the like represent various processes which may be substantially represented in computer-readable media and so executed by a computer or processor, whether or not such computer or processor is explicitly shown.

The functions of the various elements shown in the figures, including any functional block labeled as a "processor", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown.

With these fundamentals in place, we will now consider some non-limiting examples to illustrate various implementations of aspects of the present technology.

Computer System

Referring initially to FIG. 1, there is shown a computer system 100 suitable for use with some implementations of the present technology, the computer system 100 comprising various hardware components including one or more single or multi-core processors collectively represented by processor 110, a solid-state drive 120, a memory 130, which may be a random-access memory or any other type of memory.

Communication between the various components of the computer system 100 may be enabled by one or more internal and/or external buses (not shown) (e.g. a PCI bus, universal serial bus, IEEE 1394 "Firewire" bus, SCSI bus, Serial-ATA bus, etc.), to which the various hardware components are electronically coupled. According to embodiments of the present technology, the solid-state drive 120 stores program instructions suitable for being loaded into the memory 130 and executed by the processor 110 for determining a presence of an object. For example, the program instructions may be part of a vehicle control application executable by the processor 110. It is noted that the computer system 100 may have additional and/or optional components (not depicted), such as network communication modules, locationalization modules, and the like.

Networked Computer Environment

Figure 2:
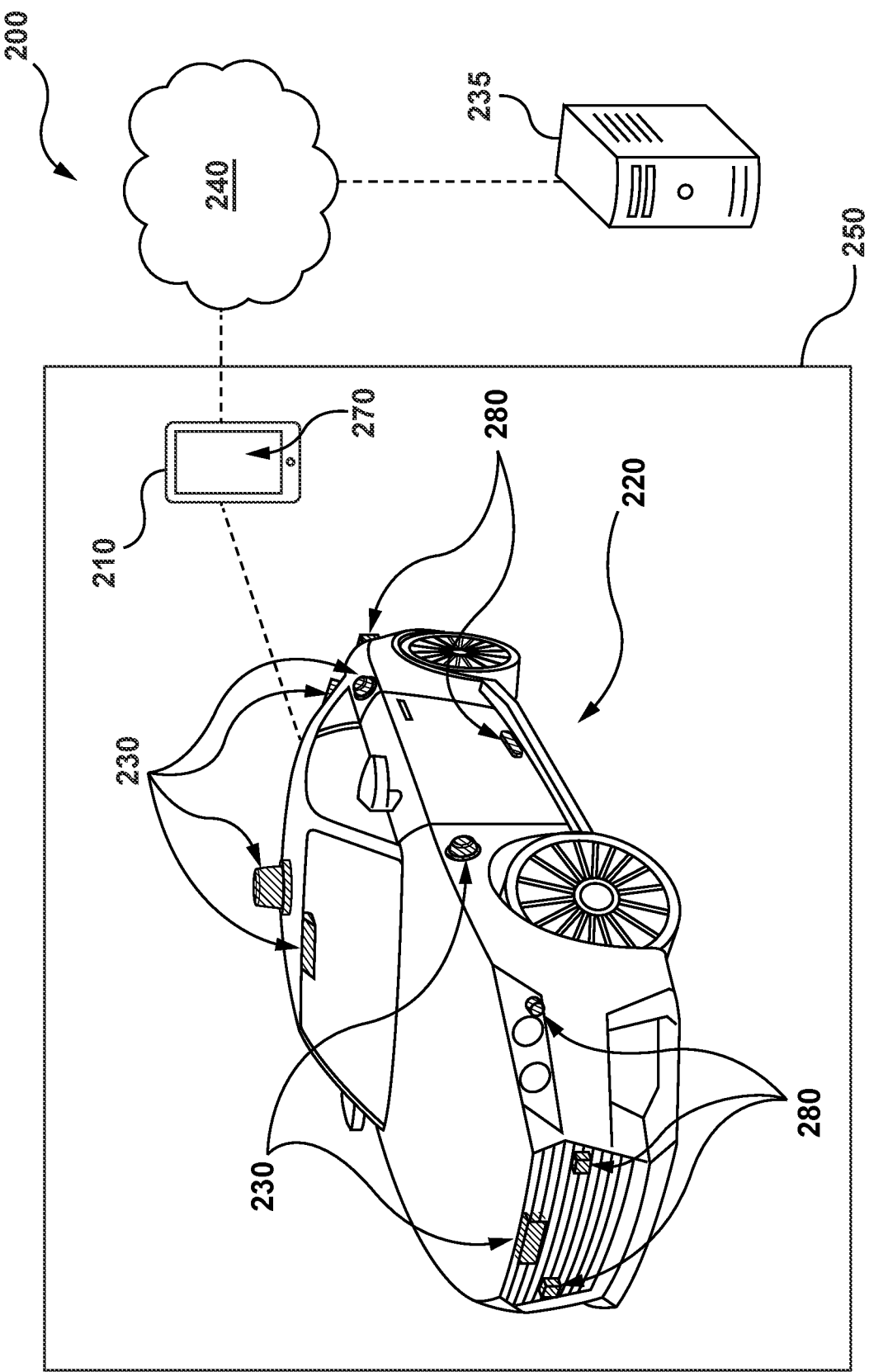
FIG. 2 depicts a networked computing environment being suitable for use with certain embodiments of the present technology.

FIG. 2 illustrates a networked computer environment 200 suitable for use with some embodiments of the systems and/or methods of the present technology. The networked computer environment 200 comprises an electronic device 210 associated with a vehicle 220, and/or associated with a user (not depicted) who is associated with the vehicle 220, such as an operator of the vehicle 220, a server 235 in communication with the electronic device 210 via a communication network 240 (e.g. the Internet or the like, as will be described in greater detail herein below).

Optionally, the networked computer environment 200 can also include a GPS satellite (not depicted) transmitting and/or receiving a GPS signal to/from the electronic device 210. It will be understood that the present technology is not limited to GPS and may employ a positioning technology other than GPS. It should be noted that the GPS satellite can be omitted altogether.

The vehicle 220 to which the electronic device 210 is associated may comprise any transportation vehicle, for leisure or otherwise, such as a private or commercial car, truck, motorbike or the like. Although the vehicle 220 is depicted as being a land vehicle, this may not be the case in each embodiment of the present technology. For example, the vehicle 220 may be a watercraft, such as a boat, or an aircraft, such as a flying drone.

The vehicle 220 may be user operated or a driver-less vehicle. In at least some embodiments of the present technology, it is contemplated that the vehicle 220 may be implemented as a Self-Driving Car (SDC). It should be noted that specific parameters of the vehicle 220 are not limiting, these specific parameters including: vehicle manufacturer, vehicle model, vehicle year of manufacture, vehicle weight, vehicle dimensions, vehicle weight distribution, vehicle surface area, vehicle height, drive train type (e.g. 2× or 4×), tire type, brake system, fuel system, mileage, vehicle identification number, and engine size.

The implementation of the electronic device 210 is not particularly limited, but as an example, the electronic device 210 may be implemented as a vehicle engine control unit, a vehicle CPU, a vehicle navigation device (e.g. TomTom™, Garmin™), a tablet, a personal computer built into the vehicle 220 and the like. Thus, it should be noted that the electronic device 210 may or may not be permanently associated with the vehicle 220. Additionally or alternatively, the electronic device 210 can be implemented in a wireless communication device such as a mobile telephone (e.g. a smart-phone or a radio-phone). In certain embodiments, the electronic device 210 has a display 270.

The electronic device 210 may comprise some or all of the components of the computer system 100 depicted in FIG. 1. In certain embodiments, the electronic device 210 is on-board computer device and comprises the processor 110, solid-state drive 120 and the memory 130. In other words, the electronic device 210 comprises hardware and/or software and/or firmware, or a combination thereof, for processing data as will be described in greater detail below.

In some embodiments of the present technology, the communication network 240 is the Internet. In alternative non-limiting embodiments, the communication network can be implemented as any suitable local area network (LAN), wide area network (WAN), a private communication network or the like. It should be expressly understood that implementations for the communication network are for illustration purposes only. A communication link (not separately numbered) between the electronic device 210 and the communication network 240 is implemented will depend inter alia on how the electronic device 210 is implemented. Merely as an example and not as a limitation, in those embodiments of the present technology where the electronic device 210 is implemented as a wireless communication device such as a smartphone or a navigation device, the communication link can be implemented as a wireless communication link. Examples of wireless communication links include, but are not limited to, a 3G communication network link, a 4G communication network link, and the like. The communication network 240 may also use a wireless connection with the server 235.

In some embodiments of the present technology, the server 235 is implemented as a computer server and may comprise some or all of the components of the computer system 100 of FIG. 1. In one non-limiting example, the server 235 is implemented as a Dell™ PowerEdge™ Server running the Microsoft™ Windows Server™ operating system, but can also be implemented in any other suitable hardware, software, and/or firmware, or a combination thereof. In the depicted non-limiting embodiments of the present technology, the server is a single server. In alternative non-limiting embodiments of the present technology (not shown), the functionality of the server 235 may be distributed and may be implemented via multiple servers.

In some non-limiting embodiments of the present technology, the processor 110 of the electronic device 210 can be in communication with the server 235 to receive one or more updates. The updates can be, but are not limited to, software updates, map updates, routes updates, weather updates, and the like. In some embodiments of the present technology, the processor 110 can also be configured to transmit to the server 235 certain operational data, such as routes travelled, traffic data, performance data, and the like. Some or all data transmitted between the vehicle 220 and the server 235 may be encrypted and/or anonymized.

It should be noted that a variety of sensors and systems may be used by the electronic device 210 for gathering information about the surroundings of the vehicle 220. As seen in FIG. 2, the vehicle 220 may be equipped with a plurality of sensor systems 280. It should be noted that different sensor systems from the plurality of sensor systems 280 may be used for gathering different types of data regarding the surroundings 250 of the vehicle 220.

In one example, the plurality of sensor systems 280 may comprise one or more camera-type sensor systems that are mounted to the vehicle 220 and communicatively coupled to the processor 110. Broadly speaking, the one or more camera-type sensor systems may be configured to gather image data about various portions of the surroundings 250 of the vehicle 220. In some cases, the image data provided by the one or more camera-type sensor systems may be used by the electronic device 210 for performing object detection procedures. For example, the electronic device 210 may be configured to feed the image data provided by the one or more camera-type sensor systems to an Object Detection Neural Network (ODNN) that has been trained to localize and classify potential objects in the surroundings 250 of the vehicle 220.

In another example, the plurality of sensor systems 280 may comprise one or more radar-type sensor systems that are mounted to the vehicle 220 and communicatively coupled to the processor 110. Broadly speaking, the one or more radar-type sensor systems may be configured to make use of radio waves to gather data about various portions of the surroundings 250 of the vehicle 220. For example, the one or more radar-type sensor systems may be configured to gather radar data about potential objects in the surroundings 250 of the vehicle 220 and which data may be representative of distance of objects from the radar-type sensor system, orientation of objects, velocity and/or speed of objects, and the like.

It should be noted that the plurality of sensor systems 280 may comprise additional types of sensor systems to those non-exhaustively described above and without departing from the scope of the present technology.

Furthermore, the vehicle 220 is equipped with one or more Light Detection and Ranging (LiDAR) systems 230 for gathering information about surroundings 250 of the vehicle 220. The LiDAR system 230 may be in addition to, or in some cases instead of, the plurality of sensor systems 280. A given LiDAR system 230 from the one or more LiDAR systems 230 may be mounted (or retrofitted) to the vehicle 220 in a variety of locations and/or in a variety of configurations.

For example, a given LiDAR system 230 may be mounted on an interior, upper portion of a windshield of the vehicle 220. Nevertheless, as illustrated in FIG. 2, other locations for mounting the given LiDAR system 230 are within the scope of the present technology, including on a back window, side windows, front hood, rooftop, front grill, front bumper or the side of the vehicle 220. In some cases, the given LiDAR system 230 can even be mounted in a dedicated enclosure mounted on the top of the vehicle 220.

As mentioned above, the one or more LiDAR systems 230 may also be mounted in a variety of configurations.

In one embodiment, the given LiDAR system 230 of the one or more LiDAR systems 230 that is illustrated in FIG. 2 as being mounted to the rooftop of the vehicle 220 may be so-mounted in a rotatable configuration. For example, the given LiDAR system 230 mounted to the vehicle 220 in a rotatable configuration may comprise at least some components that are rotatable 360 degrees about an axis of rotation of the given LiDAR system 230. It should be noted that the given LiDAR system 230 mounted in rotatable configurations may gather data about most of the portions of the surroundings 250 of the vehicle 220.

In another embodiment, the given LiDAR system 230 of the one or more LiDAR systems 230 that is mounted to the side (or the front grill, for example) of the vehicle 220 may be so-mounted in a non-rotatable configuration. For example, the given LiDAR system 230 mounted to the vehicle 220 in a non-rotatable configuration may comprise at least some components that are not rotatable 360 degrees and are configured to gather data about pre-determined portions of the surroundings 250 of the vehicle 220.

Irrespective of the specific location and/or the specific configuration, the given LiDAR system 230 is configured to capture data about the surroundings 250 of the vehicle 220 for building a multi-dimensional map of objects in the surroundings 250 of the vehicle 220. How the given one or more LiDAR systems 230 are configured to capture data about the surroundings 250 of the vehicle 220 will now be described.

LiDAR System

Figure 3:
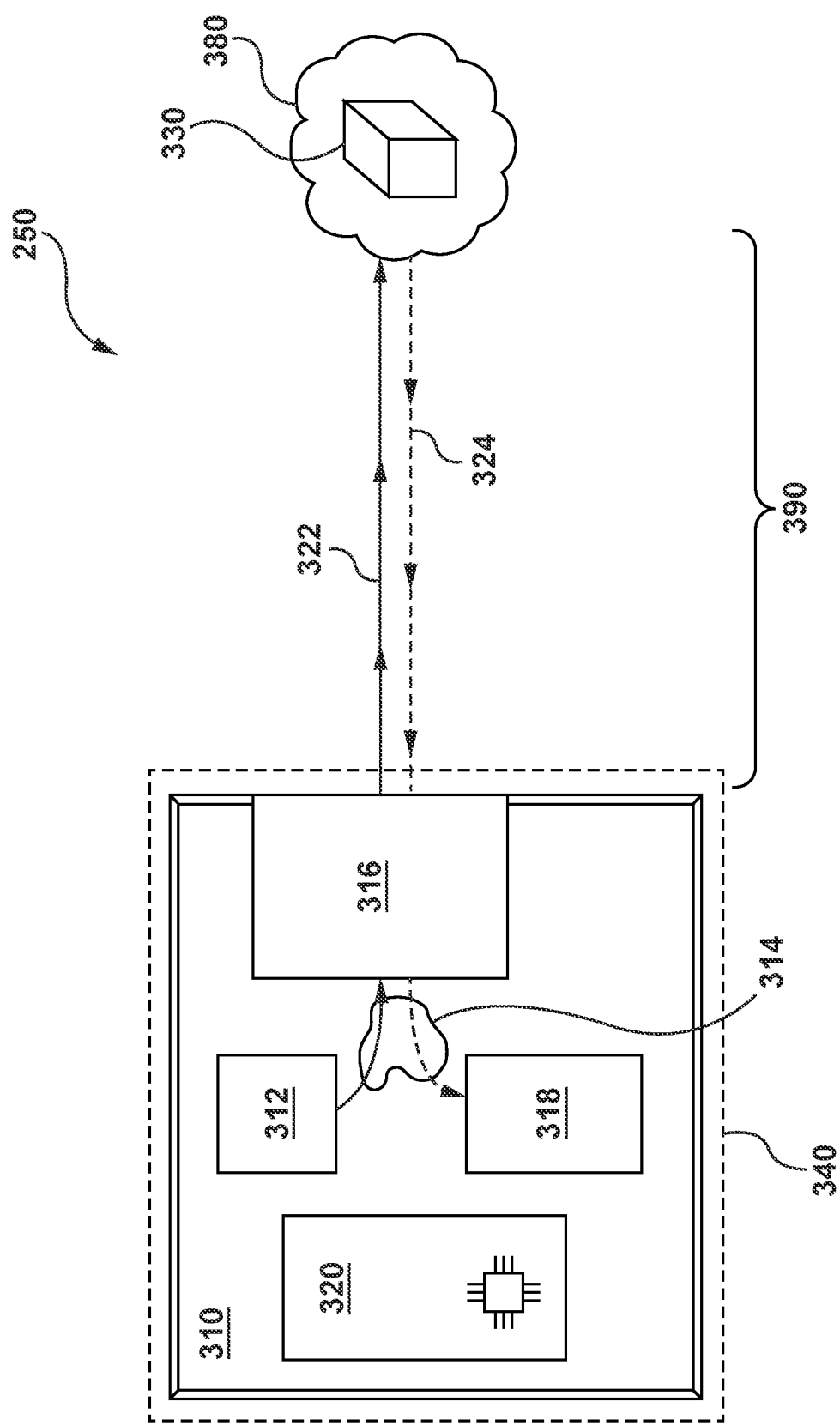
FIG. 3 depicts a schematic diagram of an example LiDAR system for implementing certain embodiments of systems and/or methods of the present technology.

With reference to FIG. 3, there is depicted a non-limiting example of a LiDAR system 310. It should be noted that the one or more LiDAR systems 230 (see FIG. 2) may be implemented in a similar manner to the implementation of the LiDAR system 310.

Broadly speaking, the LiDAR system 310 may comprise a variety of internal components such as, but not limited to: (i) a radiation source component 312, such as a light source component, (ii) a scanner component 316, (iii) a receiver component 318 (also referred to herein as detection system), and (iv) a controller component 320. It is contemplated that in addition to the internal components non-exhaustively listed above, the LiDAR system 310 may further comprise a variety of sensors (such as, for example, a temperature sensor, a moisture sensor, etc.) which are omitted from FIG. 3 for sake of clarity.

It is contemplated that, in some cases, one or more of internal components of the LiDAR system 310 may be implemented in a common housing 340 as depicted in FIG. 3. In other implementations, at least the controller component 320 may be located remotely from the common housing 340.

Radiation Source Component

The radiation source component 312 is communicatively coupled to the controller component 320 and is configured to emit radiation, such as a radiation signal in the form of a beam. In certain embodiments, the radiation source component 312 is configured to emit light, and is referred to herein as a light source component 312. The light source component 312 comprises one or more lasers that emit light having a particular operating wavelength. The operating wavelength of the light source component 312 may be in the infrared, visible, and/or ultraviolet portions of the electromagnetic spectrum. For example, the light source component 312 may include one or more lasers with an operating wavelength between about 650 nm and 1150 nm. Alternatively, the light source may include a laser diode configured to emit light at a wavelength between about 800 nm and about 1000 nm, between about 850 nm and about 950 nm, or between about 1300 nm and about 1600 nm. However, it should be noted that the light source component 312 may include lasers with different operating wavelengths, without departing from the scope of the present technology. In certain other embodiments, the light source component 312 comprises a light emitting diode (LED).

In operation, the light source component 312 generates an output beam 322 of light. It is contemplated that the output beam 322 may have any suitable form such as continuous-wave, or pulsed. As illustrated in FIG. 3, the output beam 322 exits the LiDAR system 310 and is directed downrange towards the surroundings 250.

Let it be assumed that an object 330 is located at a distance 390 from the LiDAR system 310. It should be noted though, as will be explained below in greater detail, the presence of the object 330 and the distance 390 are not apriori known and that the purpose of the LiDAR system 310 is to locate the object 330 and/or capture data for building a multi-dimensional map of at least a portion of the surroundings 250 with the object 330 (and other potential objects) being represented in it in a form of one or more data points.

Once the output beam 322 reaches the object 330, the object 330 may reflect at least a portion of light from the output beam 322, and some of the reflected light beams may return back towards the LiDAR system 310. By reflected is meant that at least a portion of light beam from the output beam 322 bounces off the object 330. A portion of the light beam from the output beam 322 may be absorbed by the object 330.

In the example illustrated in FIG. 3, the reflected light beam is represented by input beam 324. The input beam 324 is captured by the LiDAR system 310 via the receiver component 318. It should be noted that, in some cases, the input beam 324 may contain only a relatively small fraction of the light from the output beam 322. It should also be noted that an angle of the input beam 324 relative to a surface of the object 330 ("angle of incidence") may be the same or different than an angle of the output beam 322 relative to surface of the object 330 ("angle of reflection").

It should also be noted that the operating wavelength of the LiDAR system 310 may lie within portions of the electromagnetic spectrum that correspond to light produced by the sun. Therefore, in some cases, sunlight may act as background noise which can obscure the light signal detected by the LiDAR system 310. This solar background noise can result in false-positive detections and/or may otherwise corrupt measurements of the LiDAR system 310. Although it may be feasible to increase a Signal-to-Noise Ratio (SNR) of the LiDAR system 310 by increasing the power level of the output beam 322, this may not be desirable in at least some situations. For example, increasing power levels of the output beam 322 may result in the LiDAR system 310 not being eye-safe.

It is contemplated that the LiDAR system 310 may comprise an eye-safe laser, or put another way, the LiDAR system 310 may be classified as an eye-safe laser system or laser product. Broadly speaking, an eye-safe laser, laser system, or laser product may be a system with some or all of: an emission wavelength, average power, peak power, peak intensity, pulse energy, beam size, beam divergence, exposure time, or scanned output beam such that emitted light from this system presents little or no possibility of causing damage to a person's eyes.

As previously alluded to, the light source component 312 may include one or more pulsed lasers configured to produce, emit, or radiate pulses of light with certain pulse duration. For example, the light source component 312 may be configured to emit pulses with a pulse duration (e.g., pulse width) ranging from 10 ps to 100 ns. In another example, the light source component 312 may emit pulses at a pulse repetition frequency of approximately 100 kHz to 5 MHz or a pulse period (e.g., a time between consecutive pulses) of approximately 200 ns to 10 μs. Overall, however, the light source component 312 can generate the output beam 322 with any suitable average optical power, and the output beam 322 may include optical pulses with any suitable pulse energy or peak optical power for a given application.

In some embodiments, the light source component 312 may comprise one or more laser diodes, such as but not limited to: Fabry-Perot laser diode, a quantum well laser, a distributed Bragg reflector (DBR) laser, a distributed feedback (DFB) laser, or a vertical-cavity surface-emitting laser (VCSEL). Just as examples, a given laser diode operating in the light source component 312 may be an aluminum-gallium-arsenide (AlGaAs) laser diode, an indium-gallium-arsenide (InGaAs) laser diode, or an indium-gallium-arsenide-phosphide (InGaAsP) laser diode, or any other suitable laser diode. It is also contemplated that the light source component 312 may include one or more laser diodes that are current-modulated to produce optical pulses.

In some embodiments, the output beam 322 emitted by the light source component 312 is a collimated optical beam with any suitable beam divergence for a given application. Broadly speaking, divergence of the output beam 322 is an angular measure of an increase in beam size (e.g., a beam radius or beam diameter) as the output beam 322 travels away from the light source component 312 or the LiDAR system 310. In some embodiments, the output beam 322 may have a substantially circular cross section.

It is also contemplated that the output beam 322 emitted by the light source component 312 may be unpolarized or randomly polarized, may have no specific or fixed polarization (e.g., the polarization may vary with time), or may have a particular polarization (e.g., the output beam 322 may be linearly polarized, elliptically polarized, or circularly polarized).

In at least some embodiments, the output beam 322 and the input beam 324 may be substantially coaxial. In other words, the output beam 322 and input beam 324 may at least partially overlap or share a common propagation axis, so that the input beam 324 and the output beam 322 travel along substantially the same optical path (albeit in opposite directions). Nevertheless, in other embodiments, it is contemplated that the output beam 322 and the input beam 324 may not be coaxial, or in other words, may not overlap or share a common propagation axis inside the LiDAR system 310, without departing from the scope of the present technology.

It should be noted that in at least some embodiments of the present technology, the light source component 312 may be rotatable, such as by 360 degrees or less, about the axis of rotation (not depicted) of the LiDAR system 310 when the LiDAR system 310 is implemented in a rotatable configuration. However, in other embodiments, the light source component 312 may be stationary even when the LiDAR system 310 is implemented in a rotatable configuration, without departing from the scope of the present technology.

Internal Beam Paths

As schematically illustrated in FIG. 3, the LiDAR system 310 may make use of a given internal beam path from a plurality of internal beam paths 314 for emitting the output beam 322 (generated by the light source component 312) towards the surroundings 250. In one example, the given internal beam path amongst the plurality of internal beam paths 314 may allow providing the light from the light source component 312 to the scanner component 316 and, in turn, the scanner component 316 may allow the output beam 322 to be directed downrange towards the surroundings 250.

Also, the LiDAR system 310 may make use of another given internal beam path from the plurality of internal beam paths 314 for providing the input beam 324 to the receiver component 318. In one example, the another given internal beam path amongst the plurality of internal beam paths 314 may allow providing the input beam 324 from the scanner component 316 to the receiver component 318. In another example, the another given internal beam path amongst the plurality of internal beam paths 314 may allow providing the input beam 324 directly from the surroundings 250 to the receiver component 318 (without the input beam 324 passing through the scanner component 316).

It should be noted that the plurality of internal beam paths 314 may comprise a variety of optical components. For example, the LiDAR system 310 may include one or more optical components configured to condition, shape, filter, modify, steer, or direct the output beam 322 and/or the input beam 324. For example, the LiDAR system 310 may include one or more lenses, mirrors, filters (e.g., band pass or interference filters), optical fibers, circulators, beam splitters, polarizers, polarizing beam splitters, wave plates (e.g., half-wave or quarter-wave plates), diffractive elements, microelectromechanical (MEM) elements, collimating elements, or holographic elements.

It is contemplated that in at least some embodiments, the given internal beam path and the another internal beam path from the plurality of internal beam paths 314 may share at least some common optical components, however, this might not be the case in each and every embodiment of the present technology.

Scanner Component

Generally speaking, the scanner component 316 steers the output beam 322 in one or more directions downrange towards the surroundings 250. The scanner component 316 may comprise a variety of optical components and/or mechanical-type components for performing the scanning of the output beam 322. For example, the scanner component 316 may include one or more mirrors, prisms, lenses, MEM components, piezoelectric components, optical fibers, splitters, diffractive elements, collimating elements, and the like. It should be noted the scanner component 316 may also include one or more actuators (not illustrated) driving at least some optical components to rotate, tilt, pivot, or move in an angular manner about one or more axes, for example.

The scanner component 316 may be configured to scan the output beam 322 over a variety of horizontal angular ranges and/or vertical angular ranges. In other words, the scanner component 316 may be instrumental in providing the LiDAR system 310 with a desired Region of Interest (ROI) 380. The ROI 380 of the LiDAR system 310 may refer to an area, a volume, a region, an angular range, and/or portion(s) of the surroundings 250 about which the LiDAR system 310 may be configured to scan and/or can capture data.

It should be noted that the scanner component 316 may be configured to scan the output beam 322 horizontally and/or vertically, and as such, the ROI 380 of the LiDAR system 310 may have a horizontal direction and a vertical direction. For example, the LiDAR system 310 may have a horizontal ROI of 360 degrees and a vertical ROI of 45 degrees.

The scanner component 316 may be communicatively coupled to the controller component 320. As such, the controller component 320 may be configured to control the scanner component 316 so as to guide the output beam 322 in a desired direction downrange and/or along a desired scan pattern. Broadly speaking, a scan pattern may refer to a pattern or path along which the output beam 322 is directed by the scanner component 316 during operation.

The LiDAR system 310 may thus make use of the scan pattern to generate a point cloud substantially covering the ROI 380 of the LiDAR system 310. As will be described in greater detail herein further below, this point cloud of the LiDAR system 310 may be used to render a multi-dimensional map of objects in the surroundings 250 of the vehicle 220.

In operation, in certain embodiments, the light source component 312 emits pulses of light (represented by the output beam 322) which the scanner component 316 scans across the ROI 380 of the LiDAR system 310 in accordance with the scan pattern. As mentioned above, the object 330 may reflect one or more of the emitted pulses. The receiver component 318 receives or detects photons from the input beam 324 and generates one or more representative data signals. For example, the receiver component 318 may generate an output electrical signal 422 (discussed below) that is representative of the input beam 324. The receiver component 318 may also provide the so-generated electrical signal to the controller component 320 for further processing.

Receiver Component

The receiver component 318 is communicatively coupled to the controller component 320 and may be implemented in a variety of ways. For example, the receiver component 318 may comprise a photoreceiver, optical receiver, optical sensor, detector, photodetector, optical detector, optical fibers, and the like. As mentioned above, in some embodiments, the receiver component 318 acquires or detects at least a portion of the input beam 324 and produces an electrical signal that corresponds to the input beam 324. For example, if the input beam 324 includes an optical pulse, the receiver component 318 may produce an electrical current or voltage pulse that corresponds to the optical pulse detected by the receiver component 318.

It is contemplated that the receiver component 318 may be implemented with one or more avalanche photodiodes (APDs), one or more single-photon avalanche diodes (SPADs), one or more PN photodiodes (e.g., a photodiode structure formed by a p-type semiconductor and a n-type semiconductor), one or more PIN photodiodes (e.g., a photodiode structure formed by an undoped intrinsic semiconductor region located between p-type and n-type regions), and the like.

In some non-limiting embodiments, the receiver component 318 may also comprise circuitry that performs signal amplification, sampling, filtering, signal conditioning, analog-to-digital conversion, time-to-digital conversion, pulse detection, threshold detection, rising-edge detection, falling-edge detection, and the like. For example, the receiver component 318 may include electronic components configured to convert a received photocurrent (e.g., a current produced by an APD in response to a received optical signal) into a voltage signal. The receiver component 318 may also include additional circuitry for producing an analog or digital output signal that corresponds to one or more characteristics (e.g., rising edge, falling edge, amplitude, duration, and the like) of a received optical pulse.

Controller Component

Depending on the implementation, the controller component 320 may include one or more processors, an application-specific integrated circuit (ASIC), a field-programmable gate array (FPGA), and/or other suitable circuitry. The controller component 320 may also include non-transitory computer-readable memory to store instructions executable by the controller component 320 as well as data which the controller component 320 may produce based on the signals acquired from other internal components of the LiDAR system 310 and/or may provide signals to the other internal components of the LiDAR system 310. The memory can include volatile (e.g., RAM) and/or non-volatile (e.g., flash memory, a hard disk) components. The controller component 320 may be configured to generate data during operation and store it in the memory. For example, this data generated by the controller component 320 may be indicative of the data points in the point cloud of the LiDAR system 310.

It is contemplated that in at least some non-limiting embodiments of the present technology, the controller component 320 may be implemented in a similar manner to the electronic device 210 and/or the computer system 100, without departing from the scope of the present technology.

In addition to collecting data from the receiver component 318, the controller component 320 may also be configured to provide control signals to, and potentially receive diagnostics data from, the light source component 312 and the scanner component 316.

As previously stated, the controller component 320 is communicatively coupled to one or more of the light source component 312, the scanner component 316, and the receiver component 318. The controller component 320 may receive electrical trigger pulses from the light source component 312, where each electrical trigger pulse corresponds to the emission of an optical pulse by the light source component 312. The controller component 320 may further provide instructions, a control signal, and/or a trigger signal to the light source component 312 indicating when the light source component 312 is to produce optical pulses.

Just as an example, the controller component 320 may be configured to send an electrical trigger signal that includes electrical pulses, so that the light source component 312 emits an optical pulse in response to each electrical pulse of the electrical trigger signal. It is also contemplated that, the controller component 320 may cause the light source component 312 to adjust one or more characteristics of light produced by the light source component 312 such as, but not limited to: frequency, period, duration, pulse energy, peak power, average power, and wavelength of the optical pulses.

It should be noted that the controller component 320 may be configured to determine a "time-of-flight" value for an optical pulse based on timing information associated with (i) when a given pulse was emitted by light source component 312 and (ii) when a portion of the pulse (e.g., from the input beam 324) was detected or received by the receiver component 318.

It is contemplated that the controller component 320 may be configured to analyze one or more characteristics of the electrical signals from the light source component 312 and/or the receiver component 318 to determine one or more characteristics of the object 330 such as the distance 390 downrange from the LiDAR system 310.

For example, the controller component 320 may determine the time-of-flight value and/or a phase modulation value for the emitted pulse of the output beam 322. Let it be assumed that the LiDAR system 310 determines the time-of-flight value "T" representing, in a sense, a "round-trip" time for an emitted pulse to travel from the LiDAR system 310 to the object 330 and back to the LiDAR system 310. As a result, the controller component 320 may be configured to determine the distance 390 in accordance with the following equation:

$$D = \frac{c * T}{2} \qquad \text{(Equation 1)}$$

wherein D is the distance 390, T is the time-of-flight value, and c is the speed of light. Although, the ideal speed of light in vacuum is 299,792,458 m/s however, the actual value of speed of light may depend upon the refractive index n of the medium in which the light is travelling. The relation between the ideal speed of light in vacuum and the speed of light a given medium is given in accordance with the following equation:

$$v = \frac{c}{n} \qquad \text{(Equation 2)}$$

wherein v is the velocity of light in a given medium and n is the refractive index of the corresponding medium. For example, if the medium is air, the refractive index n is approximately equal to 1.0003 and hence the speed of light is approximately equal to 299, 702,547 m/s. Similarly, if the medium is a glass, the refractive index n is approximately equal to 1.5 and hence the speed of light is approximately equal to 199,861,638 m/s. It is to be noted that for the purpose of simplicity the speed of light in air is considered as approximately equal to $3.0 \times 10^8$ m/s for making various calculations in the present disclosure. However, the actual value of speed of light may be considered for making various calculations without limiting the scope of present technology.

As previously alluded to, the LiDAR system 310 is used to determine the distance to one or more other potential objects located in the surroundings 250. By scanning the output beam 322 across the ROI 380 of the LiDAR system 310 in accordance with a scanning pattern, the LiDAR system 310 is configured to map distances (similar to the distance 390) to respective data points within the ROI 380 of the LiDAR system 310. As a result, the LiDAR system 310 may be configured to render these data points captured in succession (e.g., the point cloud) in a form of a multi-dimensional map.

As an example, this multi-dimensional map is used by the electronic device 210 for detecting, or otherwise identifying, objects or determining a shape or distance of potential objects within the ROI 380 of the LiDAR system 310. It is contemplated that the LiDAR system 310 may be configured to repeatedly/iteratively capture and/or generate point clouds at any suitable rate for a given application.

It should be noted that a location of a given object in the surroundings 250 of the vehicle 220 may be overlapped, encompassed, or enclosed at least partially within the ROI of the LiDAR system 310. For example, the object 330 may include all or a portion of a person, vehicle, motorcycle, truck, train, bicycle, wheelchair, pushchair, pedestrian, animal, road sign, traffic light, lane marking, road-surface marking, parking space, pylon, guard rail, traffic barrier, pothole, railroad crossing, obstacle in or near a road, curb, stopped vehicle on or beside a road, utility pole, house, building, trash can, mailbox, tree, any other suitable object, or any suitable combination of all or part of two or more objects.

Figure 4:
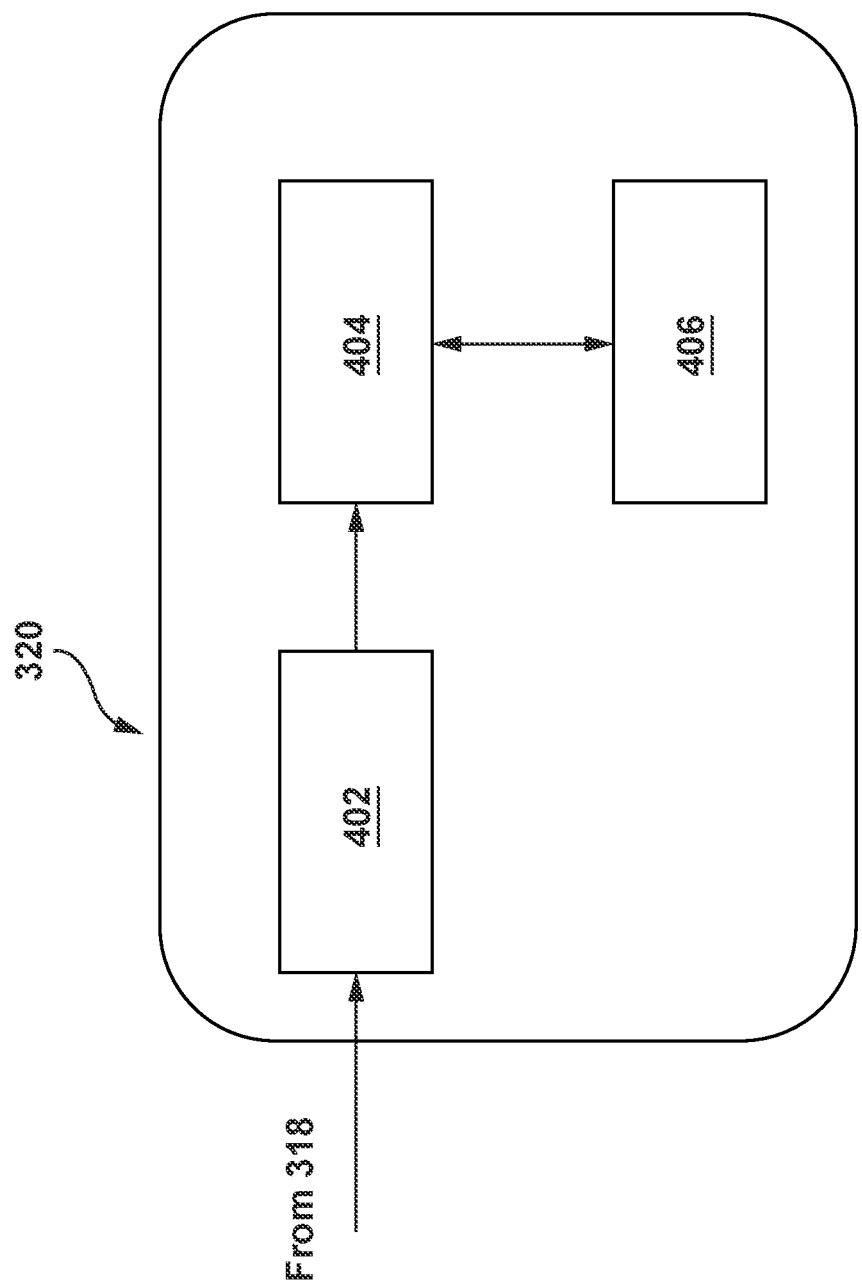
FIG. 4 depicts an implementation of the controller component executed in accordance to a specific non-limiting embodiment of the present technology.

With reference to FIG. 4, there is depicted an implementation of the controller component 320 executed in accordance to a specific non-limiting embodiment of the present technology.

More specifically, in the LiDAR system 310 the controller component 320 comprises an analog-to-digital convertor (ADC) 402, a processor 404 and a memory 406. It is to be noted that other elements may be present in at least some implementations of the present technology, but not illustrated for purposes of clarity.

Figure 5:
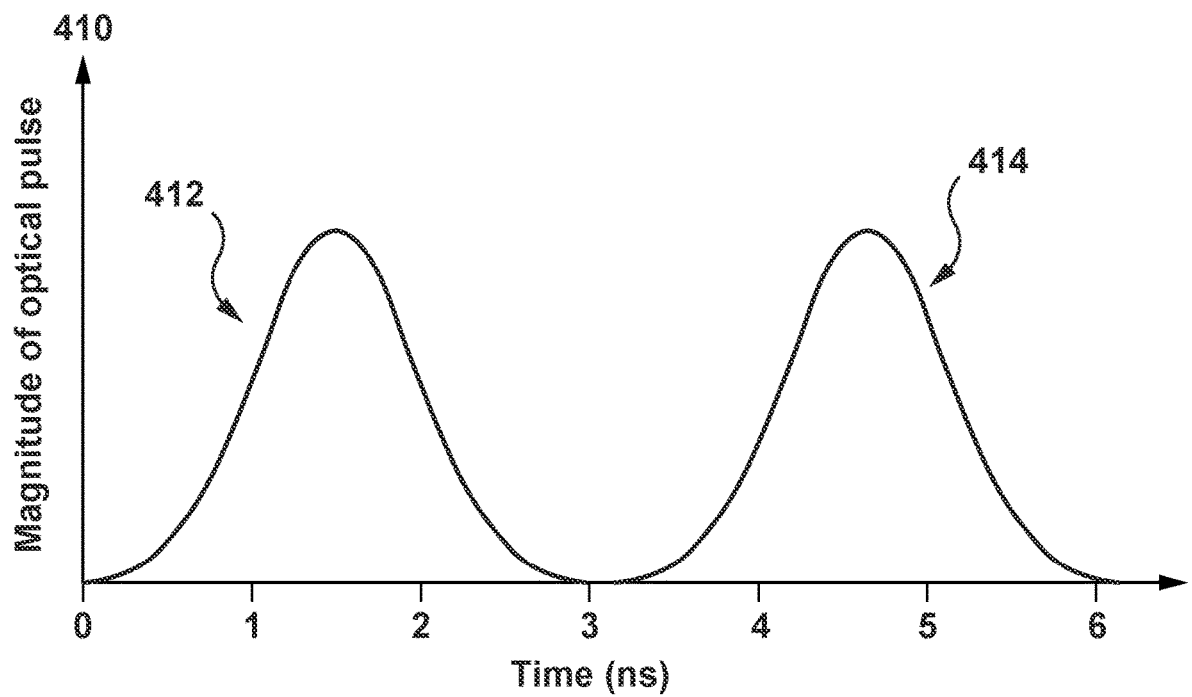
FIG. 5 illustrates a representation of a transmitted and a reflected optical pulse associated with the output and input beam respectively, in accordance to a specific non-limiting embodiment of the present technology.

As previously mentioned, the emitted output beam 322 and the reflected light beam is represented by input beam 324 may comprise optical pulses. FIG. 5 illustrates a representation 410 of a transmitted optical pulse 412 and of a reflected optical pulse 414 associated with the output beam 322 and the input beam 324 respectively, in accordance to a specific non-limiting embodiment of the present technology. The horizontal axis represents duration of the transmitted optical pulse 412 and of the reflected optical pulse 414 in nanoseconds (ns). By way of example, the duration of each one of the transmitted optical pulse 412 and the reflected optical pulse 414 may be 3 ns. However, in other examples, the duration of the reflected optical pulse 414 may be different from the duration of the transmitted optical pulse 412. The difference in duration may depend on various factors such as, whether the LiDAR system 310 and/or the object 330 are moving or stationary, type of the object 330 and many other such factors that might change the characteristics of the reflected optical pulse 414. The vertical axis represents the magnitude of the transmitted optical pulse 412 and the reflected optical pulse 414. It will be appreciated that in certain embodiments, the magnitude may be a representative of the power or energy associated with the transmitted optical pulse 412 and reflected optical pulse 414 and any other suitable pulse duration may be used without limiting the scope of present technology.

As shown, the transmitted optical pulse 412 may be transmitted towards the object 330 by the LiDAR system 310 located at the distance 390 (see FIG. 3). In one example, the distance 390 may be 50 cm. The transmitted optical pulse 412 may be reflected by the object 330 towards the LiDAR system 310. The magnitude of the reflected optical pulse 414 reflected from the object 330 may depend on the type of the object 330. For example, if the object 330 is a vehicle having a glossy metallic body, then the magnitude of the reflected optical pulse 414 may be larger if compared to the object 330 being a pedestrian. Since in the above example, the object 330 was placed at a distance 50 cm, the reflected optical pulse 414 may be received by the LiDAR system 310 after approximately 3.33 ns.

Figure 6:
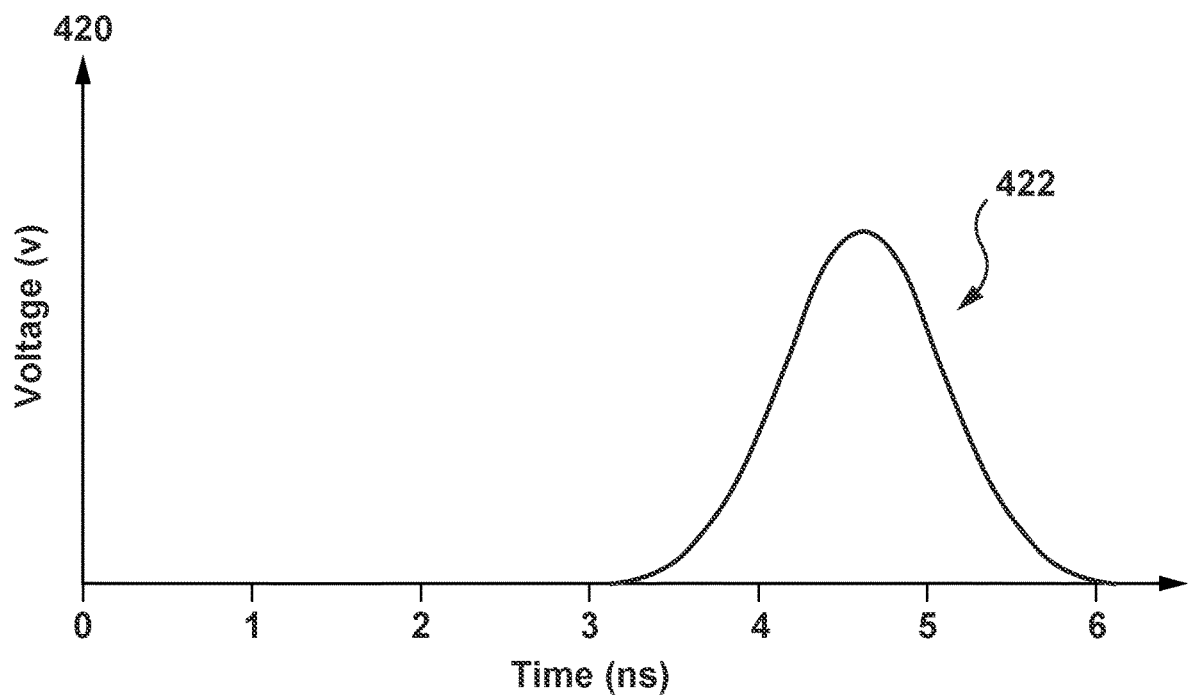
FIG. 6 illustrates a representation including an electrical pulse corresponding to the reflected optical pulse associated with the input beam, in accordance to a specific non-limiting embodiment of the present technology.

The LiDAR system 310 may provide the reflected optical pulse 414 to the receiver component 318. The receiver 318 may be configured to generate an output electrical pulse that is representative of the reflected optical pulse 414. FIG. 6 illustrates a representation 420 of an electrical pulse 422 corresponding to the reflected optical pulse 414 associated with the input beam 324, in accordance to a specific non-limiting embodiment of the present technology. It should be noted that the electrical pulse 422 may correspond to a current or voltage pulse.

Figure 7:
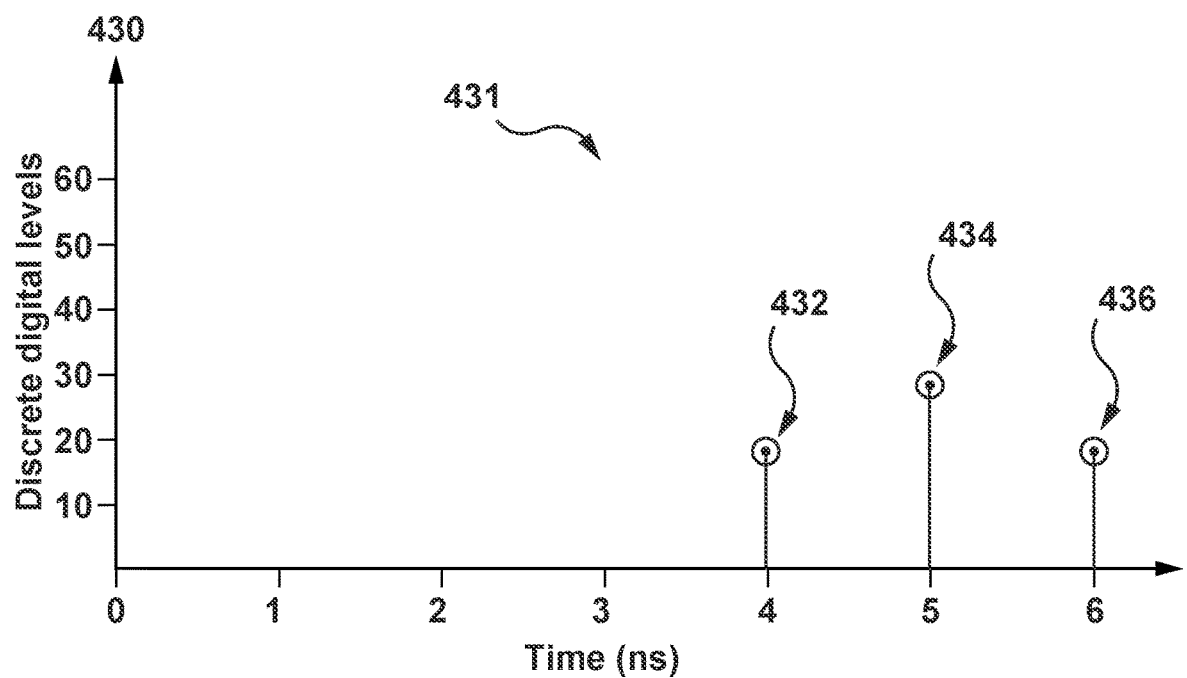
FIG. 7 illustrates a representation of a series of digital values being representative of the electrical pulse corresponding to time associated with the reflected optical pulse, in accordance to a specific non-limiting embodiment of the present technology.

The receiver component 318 may provide the electrical pulse 422 to the ADC 402 of FIG. 4. Broadly speaking, the ADC 402 is configured to convert the electrical pulse 422 into a given series of discrete digital values. For example, with reference to FIG. 7 illustrating a representation 430, the ADC 402 may be configured to produce a series of discrete digital values 431 including discrete digital values 432, 434, and 436. FIG. 7 illustrates a representation 430 of series of discrete digital values 431, including discrete digital values 432, 434, and 436 corresponding to the electrical pulse 422 in terms of time and discrete digital magnitude associated with the reflected optical pulse 414.

By way of example, the ADC 402 may be operated with a clock frequency of 1 GHz. To this end, the ADC 402 may be configured to provide a discrete digital value associated with the electrical pulse 422 for every 1 ns. In above example, since the duration of the electrical pulse 422 is 3 ns, the ADC 402 may provide three samples per electrical pulse. The discrete digital value 432 may represent a start or a value near to the start of the returned optical pulse 414, the discrete digital value 434 may represent a digital value that may be equal to the peak value or a value near to the peak of the returned optical pulse 414, and the discrete digital value 436 may represent the end value or a value near to the end of the returned optical pulse 414. However, it will be appreciated that number of samples per electrical pulse may vary depending upon the duration of the electrical pulse 422 and the clock frequency with which the ADC is being operated. In certain embodiments, the duration of the electrical pulse 422 may be any other value depending upon the duration of the returned optical pulse 414. Also, the operating clock frequency may depend upon hardware configuration associated with the LiDAR system 310.

As shown, the discrete digital value 432 may be present at time instant t=4 ns, the discrete digital value 434 may be present at time instant t=5 ns, and the discrete digital value 436 may be present at time instant t=6 ns. As such, the discrete digital values 432, 434, and 436 may represent magnitudes associated with the reflected optical pulse 414 at the respective time instants. As previously discussed, the transmitted optical pulse 412 starts at time instant t=0, peaks at time instant t=1.5 ns and ends at time instant t=3 ns. In certain embodiments, these time instants may be known a priori to the LiDAR system 310. For example, these time instants may be stored in the memory 406 and the LiDAR system 310 may provide these time instants to the processor 404. Using these time instants along with time instants associated with the discrete digital values 432, 434, and 436, the processor 404 may be configured to compute the initial time-of-flight of the transmitted optical pulse 412. In so doing, using equation (1), the processor 404 may compute the distance 390 between the object 330 and the LiDAR system 310. It is to be contemplated that the initial time-of-flight computed by the processor 404 may lack the accuracy due to limited resolution of the ADC 402.

Figure 8:
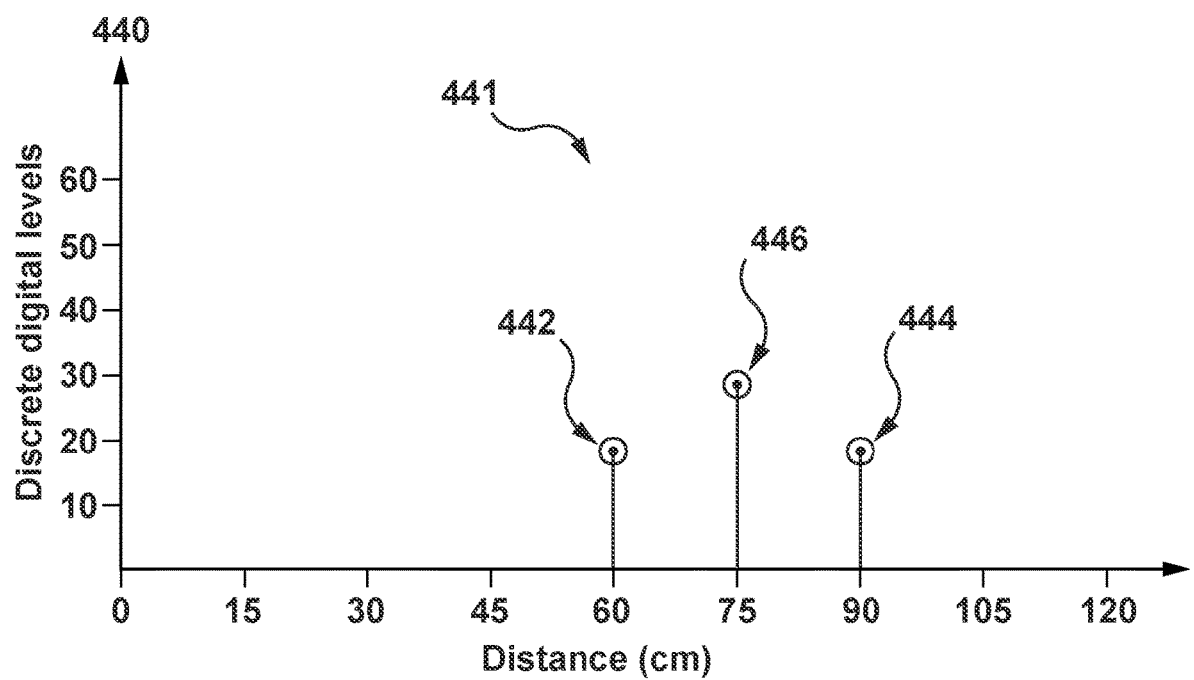
FIG. 8 illustrates a representation of series of digital values being representative of the electrical pulse corresponding to distance associated with the reflected optical, in accordance to a specific non-limiting embodiment of the present technology.

In certain embodiments, the processor 404 may convert the time instants associated with the series of discrete digital values 432, 434, and 436 into distance values. FIG. 8 illustrates a representation 440 of a series of discrete digital values 441 including discrete digital values 442, 444 and 446 which are representative of the series of discrete digital values 432, 434, and 436 in terms of distance values, in accordance to a specific non-limiting embodiment of present technology. Corresponding to the discrete digital values 432, 434, and 435 having time instants t=4 ns, 5 ns, and 6 ns the distance value associated with the discrete digital values 442, 444, and 446 are 60 cm, 75 cm, and 90 cm respectively. As such, these conversions may be performed in accordance with equation (1). It is to be noted that FIGS. 5-8 have been used for illustration purposes only and are not drawn to the scale. Moreover, the values on horizontal and vertical axis of the FIGS. 5-8 are non-limiting values in accordance with various embodiment of the present technology.

It is to be contemplated that in order to compute the distance 390, the processor 404 may use at least one of the time instants associated with the series of discrete digital values 432, 434, and 436 or at least one of the distance values associated with the discrete digital values 442, 444 and 446.

For example, if the processor 404 uses the time instants associated with the series of discrete digital values 432, 434, and 436 (as represented in FIG. 7) to compute the distance 390, the processor 404 may rely its computation based on either start, peak or end of the transmitted optical pulse 412 and the reflected optical pulse 414. If the time instant t=0 associated with the start of the transmitted optical pulse 412 and the time instant t=4 ns associated with the series of discrete digital values 432 is considered, the processor 404 may compute the distance in accordance with equation (1) as $$\left(\frac{4-0}{2}\right) \times 10^{-9} \times 3 \times 10^{10} \text{ cm},$$

which is equals to 60 cm. Similarly, if the time instant t=1.5 ns associated with the peak of the transmitted optical pulse 412 and the time instant t=5 ns associated with the series of discrete digital values 434 is considered, the processor 404 may compute the distance in accordance with equation (1) as $$\left(\frac{5-1.5}{2}\right) \times 10^{-9} \times 3 \times 10^{10} \text{ cm},$$

which is equals to 52.5 cm. Also if the time instant t=3 associated with the end of transmitted optical pulse 412 and the time instant t=6 ns associated with the series of discrete digital values 436 is considered, the processor 404 may compute the distance in accordance with equation (1) as $$\left(\frac{6-3}{2}\right) \times 10^{-9} \times 3 \times 10^{10} \text{ cm},$$

which is equals to 45 cm.

On the other hand, the processor 404 may also use the distance values associated with the discrete digital values 442, 444 and 446 (as represented in FIG. 8) to compute the distance 390. In so doing, the processor 404 may convert time instants t=0 ns, 1.5 ns, and 3 ns associated with the start, peak and end of the transmitted optical pulse 412 into distance values using equation (1) as 0 cm, 22.5 cm and 45 cm. The processor 404 may use any one of these distance values and the corresponding distance value such as 60 cm, 75 cm, or 90 cm associated with the discrete digital values 442, 444 and 446 to compute the distance between the object 330 and the LiDAR system 310. For example, the processor 404 may compute distance based on difference between respective distance values. Such as 60-0 cm which is 60 cm, 75-22.5 cm which is 52.5 cm and 90-45 cm which is 45 cm.

It is contemplated that in any of the above cases, i.e. when the processor 404 is the time instants associated with the series of discrete digital values 432, 434, and 436 (as represented in FIG. 7) or the distance values associated with the discrete digital values 442, 444 and 446 (as represented in FIG. 8) to compute the distance 390, the computed distance based on start, peak and end of the transmitted optical pulse 412 and the reflected optical pulse 414 comes out to be 45 cm, 52.5 cm, or 60 cm respectively.

However, in the above example the actual value of the distance 390 is 50 cm. It should be noted that time instants corresponding to the near start, near peak, and near end of the reflected optical pulse 414 may be typically used for precisely determining the time-of-flight of the transmitted optical pulse 412 and, hence, for precisely determining the distance 390. Although the actual time instants corresponding to the start, peak and end of the reflected optical pulse were t=3.33 ns, t=4.83 ns and t=6.33 ns respectively but the discrete digital value 432, 434, and 436 representing the near start, near peak, and near end of the reflected optical pulse 414 were calculated as t=4 ns, t=5 ns, and t=6 ns respectively.

Hence, due to the discrete nature of the output from ADC 402 and operating clock frequency, it would be difficult for the LiDAR system 310 to precisely determine the distance 390. It should be noted that the spatial and/or temporal resolution of the ADC 402 is limited by the operating clock frequency. For example, in this case ADC 402 being operated at a clock frequency of 1 GHz can provide a spatial resolution of ±15 cm and a temporal resolution of 1 ns. However, such a resolution for vehicles such as, the vehicle 220 operating in self-driving mode might not be a good option from safety point view.

In order to further improve this resolution to, for example, ±1 cm (or the discrete digital values for every 0.033 ns), in certain embodiments, the processor 404 may be configured to pre-populate a library 700 (discussed below) including template pulse profiles 600 (discussed below) and may stored the library 700 (discussed below) in the memory 406. The process of pre-populating the library 700 (discussed below) may include operating the LiDAR system 310 under controlled operating conditions and determining resolution parameters. Such operating conditions may include but not limited to varying the distance between a test object 508 (discussed below) and the LiDAR system 310, varying a type of material of the test object 508 (discussed below). Also, the resolution parameters may include a time value and/or a distance value.

Figure 9:
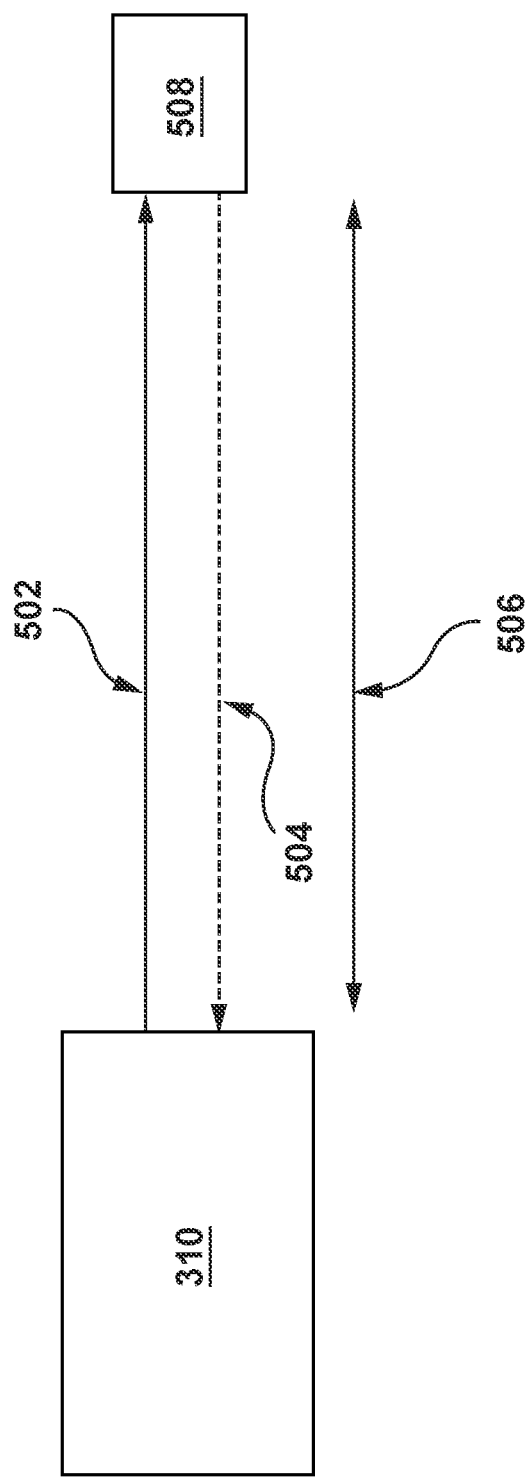
FIG. 9 illustrates operating of the LiDAR system under controlled operating conditions to populate a library, in accordance with various non-limiting embodiments of present technology.

With this said, FIG. 9 illustrates operation of the LiDAR system 310 under controlled operating conditions to populate the library 700 (discussed below) in accordance with various non-limiting embodiments of present technology. As shown, the LiDAR system 310 emits a test optical output pulse 502 (also referred to herein as transmitted test optical pulse) towards the test object 508. In certain embodiments, the test object 508 may have a respective type and may be placed at a pre-determined distance 506 from the LiDAR system 310. The type of the test object 508 may be comprise pedestrians, cyclists, other vehicles (whether stationary or moving), and the like. As such, different types of the test object 508 may have different materials with different reflection characteristic. In order to populate the library 700 (discussed below), in certain embodiments, the type of the material of the test object 508 and the distance 506 may vary. For example, non-limiting types of materials may include metal, plastic, glass, cloths, rubber, concrete, human skin, animal skin (of cats, dogs etc.) or the like.

The transmitted test optical pulse 502 may be reflected by the test object 508 as a test optical return pulse 504 (also referred to herein as reflected test optical pulse) towards the LiDAR system 310. Similarly to what has been described above with respect to FIG. 3, the receiver component 318 associated with the LiDAR system 310 may be configured to convert the reflected test optical pulse 504 into a corresponding electrical pulse (not shown). The LiDAR system 310 may provide the electrical pulse (not shown) associated with the reflected test optical pulse 504 to the ADC 402. The ADC 402 may be configured to sample and convert the electrical pulse into a template pulse profile including a series of discrete digital values.

Figure 10:
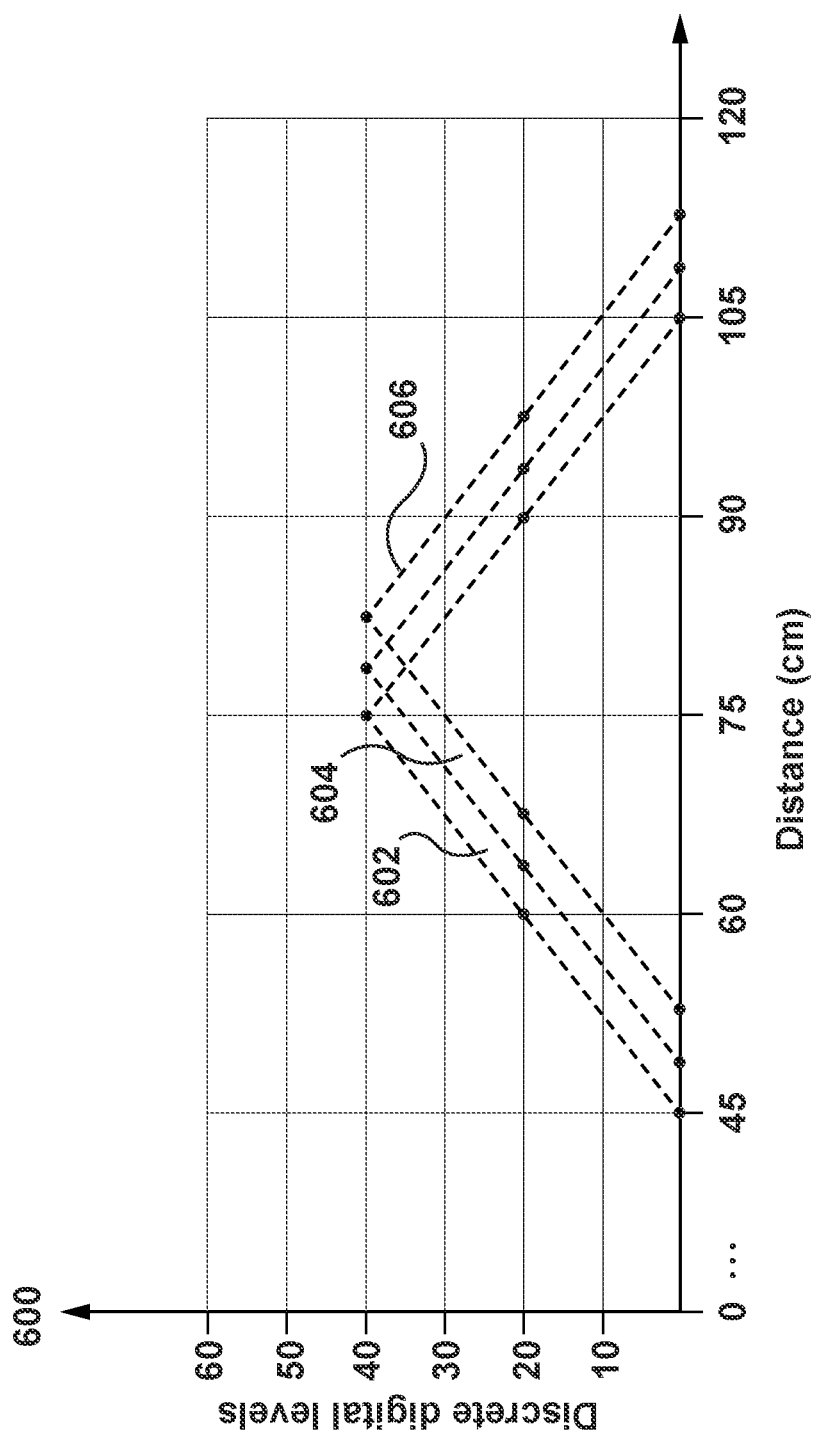
FIG. 10 illustrates a representation of a plurality of template pulse profiles generated by the processor, in accordance with various non-limiting embodiments of present technology.

The ADC 402 may provide the template pulse profile to the processor 404 for further processing. For example, such processing may include converting time values associated with the series of discrete digital values in to distance values using equation (1), determining a resolution parameter, and populating the library 700 (discussed below). FIG. 10 illustrates a representation of template pulse profiles 600 generated by the processor 404, in accordance with various non-limiting embodiments of present technology. As shown, the template pulse profiles 600 include template pulse profiles 602, 604, and 606. It is to be noted that for the purpose of simplicity only three profiles has been illustrated however, the template pulse profiles 600 may include any suitable number of template pulse profiles for a given application and depending on the configuration and requirement of the LiDAR system 310.

It is to be noted that, in certain embodiments, the ADC 402 operates with same clock frequency of the LiDAR system 310 being operated under controlled operating conditions or in real-time situation. As previously discussed, in an example the ADC 402 is being operated with a clock frequency of 1 GHz, hence the template pulse profiles 600 provides a temporal resolution of 1 ns or in other words a spatial resolution of 15 cm. However, for same type of the test object 508, each profile in the template pulse profiles 600 is generated by changing the distance 506 of the test object 508 by a predetermined increment in controlled conditions. In other words, for example, if the electrical pulse associated with the reflected test optical pulse 504 is sampled for the test object 508 being at 15 different known distances from the LiDAR system 310, then the template pulse profiles 600 may include 15 different template pulse profiles from the test object 508 (each for a respective object distance).

In order to improve the resolution of the LiDAR system 310, in certain embodiments, the position of the test object 508 relative to the LiDAR system 310 associated with one of the template pulse profiles 600 matches the distance associated with any of the marks on the resolution of the ADC 402. For instance, if the ADC 402 is being operated with a clock frequency of 1 GHz, the ADC 402 may have a resolution of 0, 15, 30, 45 cm . . . and so on. To this end, initially the test object 508 may be placed at 0 cm or 15 cm, or 30 cm, or 45 cm or so.

It may be explained experimentally by the fact that, for same type of test object 508, one of the template pulse profiles 600 generated for the test object 508 being positioned at 0 cm or 15 cm, or 30 cm, or 45 cm or so may have an identical form of magnitude. However, the absolute value of the amplitude may be in inverse proportion to the square of the distance 506 to the test object 508. For example, if the test object 508 is positioned at distance of 30 cm from the LiDAR system 310 then the associated template pulse profile may be similar to the template pulse profile when the test object 508 is positioned at a distance of 45 cm.

Further, each subsequent template pulse profile in the template pulse profiles 600 may be generated from the test object 508 whose position is shifted by, for example, 1 cm from the previous position of the test object 508. By way of example, if the test object 508 for the template pulse profile 602 is placed at 45 cm, then the next template pulse profile 604 may be generated by positioning the test object 508 at 46 cm, and so on.

In certain embodiments, the ADC 402 may provide the template pulse profile, for example the template pulse profile 602, to the processor 404. The processor 404 may be configured to determine the resolution parameter for the template pulse profile 602 based on pre-determined distance 506. Such resolution parameters may include a temporal value and/or a distance value associated with the reflected test optical pulse 504 and the test object 508. In certain embodiments, the pulse duration associated with the transmitted test optical pulse 502 may be the same as the pulse duration associated with the transmitted optical pulse 412. In this example, the pulse duration of the transmitted test optical pulse 502 is equal to 3 ns, the test object 508 is placed at 45 cm from the LiDAR system 310, and the type of the material of the test object 508 is plastic.

The LiDAR system 310 may transmit the transmitted test optical pulse 502 towards the test object 508 at time instant t=0. The transmitted test optical pulse 502 may contact the test object 508 and thus reflect as the reflected test optical pulse 504. Since the test object 508 is placed at 45 cm from the LiDAR system 310, the reflected test optical pulse 504 may be received at time instant t=3 ns and lasts until time instant t=6 ns. The ADC 402 may provide a discrete digital value at time instant t=3 ns representing near start of the reflected test optical pulse 504, a discrete digital value at instant t=5 ns representing near peak of the reflected test optical pulse 504 and a discrete digital value at instant t=6 ns representing near end of the reflected test optical pulse 504.

The processor 404 may convert the discrete digital values representing time instants and magnitudes associated with the reflected test optical pulse 504 to discrete digital values representing distance and magnitudes. In certain embodiments, the discrete digital values representing distance and magnitudes may correspond to the template pulse profile 602 as shown in FIG. 10. Further, using the template pulse profile 602, the processor 404 may compute the distance 506 between the test object 508 and the LiDAR system 310. Since in this example, the discrete digital value at t=3 ns representing near start of the reflected test optical pulse 504 is equal to the actual time instant at which the reflected test optical pulse 504 was received, the computed distance 506 equals to the actual distance. Therefore, a distance compensation associated with the resolution parameter for the template pulse profile 602 may be equal to zero.

Now, for same type of the material of the test object 508 (i.e., plastic), the distance 506 may be increased by 1 cm and the distance 506 equals to 46 cm. The LiDAR system 310 may transmit the transmitted test optical pulse 502 towards the test object 508 at time instant t=0. The transmitted test optical pulse 502 may contact the test object 508 and thus reflect as the reflected test optical pulse 504. Since the test object 508 is placed at 46 cm from the LiDAR system 310, the reflected test optical pulse 504 may be received approximately at time instant t=3.067 ns and lasts till time instant t=6.067 ns.

In this example, since the ADC 402 is operating at the clock frequency of 1 GHz, so the ADC 402 may provide discrete digital values for every 1 ns. Since, the reflected test optical pulse 504 crosses the time instant t=3 ns, the ADC 402 may provide the next discrete digital value at time instant t=4 ns representing near start of the reflected test optical pulse 504. At time instant t=5 ns, the ADC 402 may provide discrete digital value representing near peak of the reflected test optical pulse 504. Also the reflected test optical pulse 504 lasts until time instant t=6.067 ns, the ADC 402 may provide discrete digital value at time instant t=6 ns representing near end of the reflected test optical pulse 504.

As previously mentioned, the processor 404 may convert the discrete digital values representing time instants and magnitudes associated with the reflected test optical pulse 504 to discrete digital values representing distance and magnitudes. In certain embodiments, the discrete digital values representing distance and magnitudes may correspond to the template pulse profile 604 as shown in FIG. 10. Further, using the template pulse profile 604, the processor 404 may compute the distance 506 between the test object 508 and the LiDAR system 310.

In this example, the discrete digital value at time instant t=4 ns representing near start of the reflected test optical pulse 504 is not equal to the actual time instant at which the reflected test optical pulse 504 was received. The discrete digital value at t=5 ns representing near peak of the reflected test optical pulse 504 is not equal to the actual time instant at which the reflected test optical pulse 504 has its peak. Also, the discrete digital value at t=6 ns representing near end of the reflected test optical pulse 504 is not equal to the actual time instant at which the reflected test optical pulse 504 ends.

To this end, in certain embodiments, the processor 404 may use the time instant t=4 ns representing near start of the reflected test optical pulse 504, the time instant t=5 ns representing near peak of the reflected test optical pulse 504, the time instant t=6 ns representing near end of the reflected test optical pulse 504 or all the time instants for computing the distance 506. Considering, time instant t=4 ns, the computed distance 506 comes out to be equals to 60 cm. For time instant t=5 ns, the computed distance 506 comes out to be equals to 52.5 cm. For time instant t=6 ns, the computed distance 506 comes out to be equals to 45 cm. For all the cases above, the computed distance was not equal to the actual distance. Therefore, for this case the processor 404 computes distance compensation factor associated with the resolution parameter for the template pulse profile 602.

The processor 404 may have apriori information about the actual distance of the test object 508 from the LiDAR system 310. Using this apriori information, the processor 404 may determine the distance compensation factor associated with the resolution parameter. In so doing, the processor 404 may compare the calculated distance 506 with the actual distance and may compute a difference value as the distance compensation. For example, if the actual distance was 46 cm and for time instant t=4 ns, as the computed distance 506 comes out to be equals to 60 cm. The distance compensation in this case may be equal to a difference between the actual distance and the computed distance i.e. −14 cm. For time instant t=5 ns, as the computed distance 506 comes out to be 52.5 cm. The distance compensation in this case may be −6.5 cm. For time instant t=6 ns, as the computed distance 506 comes out to be equals to 45 cm. The distance compensation in this case may be −1 cm.

In certain non-limiting embodiments, the processor 404 may be provided with a priori information of actual time instants of the start, peak and end of the reflected test optical pulse 504. Based on difference between the actual time instants and computed time instants corresponding to the near start, near peak and near end of the reflected test optical pulse 504, the processor 404 may be configured to compute time compensation resolution parameters. It is to be contemplated that in certain embodiments, the LiDAR system 310 may be configured to compute time compensation resolution parameters based on any one of the near start, near peak and near end of the reflected test optical pulse 504.

Based on type of time instants being used to compute time compensation resolution parameters, various components may be calibrated accordingly.

For instance, in the above example the material of the test object 508 is plastic and is placed at a distance of 46 cm from the LiDAR system 310. The actual time instants corresponding to the start, peak and end of the reflected test optical pulse 504 may be equal 3.067 ns, 4.567 ns, and 6.067 ns respectively. By way of example, the time instant corresponding to peak of the reflected test optical pulse 504 may be equal to the average value of the time instants corresponding to the start and the end of the reflected test optical pulse 504.

As noted above, the ADC 402 may provide the discrete digital value at time instants 4 ns, 5 ns, and 6 ns representing the near start, near peak, and near end of the reflected test optical pulse 504. In order to compute the time compensation resolution parameters, the processor 404 may be configured to compute the difference between the actual time instants and the computed time instants. For instance, the time compensation resolution parameter corresponding to the near start of the reflected optical pulse 504 may be equal to the difference between time instant of actual start of the reflected test optical pulse 504 and the respective computed time instant. In this case, the difference may be equals to −0.933 ns. Similarly, the time compensation resolution parameter corresponding to the near peak and the near end of the reflected optical pulse 504 may be equal to −0.433 ns and +0.067 ns respectively. The processor 404 may be configured to compute the time compensation resolution parameters for various types of the test object 508 placed at different distances from the LiDAR system 310. In certain embodiments, the processor 404 may use the time compensation resolution parameter for determining an actual time-of-flight of the object 330.

Once the processor 404 computes the time compensation resolution parameters and distance compensation resolution parameters, the processor 404 may be configured to populate the library 700 (discussed below) with a record for various template pulse profiles 600. Such a record may be an indicative of the respective template pulse profile, such as 602, 604, or 606, the given type of the material of the test object 508, such as plastic, rubber, metal, concrete, and the like, the associated resolution parameters such as, distance compensation and/or time compensation. In certain embodiments, the record may also contain average power and/or average energy associated with the reflected test optical pulse 504 for a particular test object 508 placed at a particular distance 506.

FIG. 11 illustrates a representation of the library 700 populated by the processor 404, in accordance with various non-limiting embodiments of present technology. In certain embodiments, the processor 404 may be configured to populate the library 700 with a list of the template pulse profiles 600 along with various associated records. As shown, the library 700 may include a type of the material of the test object from a plurality of types of material of the test objects, distance at which the test object is placed with respect to the LiDAR system 310, and resolution parameters and the template pulse profiles 600. In certain non-limiting embodiments, the library 700 may further include normalized average power associated with the reflected test optical pulse 504. As such, the normalizing the average power may include dividing the average power with a maximum power associated with the transmitted test optical pulse 502.

Although, the library 700 has been illustrated to include the time compensation resolution parameters as well as distance compensation resolution parameters however, in certain embodiments, the library 700 may include only the time compensation resolution parameters or the distance compensation resolution parameters. Moreover, populating the library 700 with the time compensation resolution parameters associated with the near start, near peak and near end of the reflected test optical pulse 504 is merely an example and not a limitation. For example, in certain embodiments, the library 700 may include time compensation resolution parameters associated with at least one of the near start, near peak and near end of the reflected test optical pulse 504. Similarly, populating the library 700 with the distance compensation resolution parameters associated with the near start, near peak and near end of the reflected test optical pulse 504 is merely an example and not a limitation. For example, in certain embodiments, the library 700 may include distance compensation resolution parameters associated with at least one of the near start, near peak and near end of the reflected test optical pulse 504.

For a given type of the material of the test object 508 such as plastic, rubber, metal, concrete or the like, the test object 508 may be placed at various locations such as at 45 cm, 46 cm, 47 cm and so on. The processor 404 may then compute resolution parameters as discussed above. In certain embodiments, the processor 404 may utilize the start of the transmitted test optical pulse 502 and time instant associated with the discrete digital value representing the near start of the reflected test optical pulse 504 to compute the resolution parameter. In other embodiment, the processor 404 utilize end of the transmitted test optical pulse 502 and time instant associated with the discrete digital value representing the near end of the reflected test optical pulse 504 to compute the resolution parameter.

It is to be noted that calculation of resolution parameter should not be limited to start or end of optical pulses. For example, in certain embodiments, the processor 404 may utilize peak values of the transmitted test optical pulse 502 and time instant associated with the discrete digital value representing near peak of the reflected test optical pulse 504. In certain non-limiting embodiments, the processor 404 may compute average power of the reflected test optical pulse 504, normalize the computed average power and store it in the library 700.

It will be appreciated that the power of the reflected optical pulse 504 may be a function of type of the test object 508. For instance, if the selected test object 508 is a vehicle, then the power associated with the test optical 504 may be more than the power associated with the reflected test optical pulse 504 when the type of the material of the test object 508 is plastic. One of the reasons for this variation of power is difference in reflection characteristic of the test object 508. For the type of the material of the test object 508 being a metal may have a high reflectivity coefficient and hence, the power of the reflected test optical pulse 504 may be more as compare to the type of the material of the test object 508 being plastic. As such, the different reflection characteristics of the test object 508 may shift the peak of the reflected test optical pulse 504 and peak of the associated discrete digital values.

Once the library 700 is created and populated, the processor 404 may store the library 700 in the memory 406. The LiDAR system 310 may access the library 700 in order to increase the resolution of the ADC 402 and improve the accuracy in measuring the distance between the object 330 and the LiDAR system 310 in-use conditions. Such in-use condition may refer to a condition where the LiDAR system 310 is used to operate the vehicle 220. It is to be noted that prior to acquiring the series of discrete digital values 431, the processor 404 may populate the library 700 with the list of the template pulse profiles 600 along with various associated records. It is to be noted that the library 700 illustrates a limited number of type of materials of the test objects placed at limited number distances merely for the purpose of simplicity.

However, the library 700 may include any number of different types of material of test objects having different reflection characteristics placed at any number of distances depending on the configuration of the LiDAR system 310 and the associated arrangements. Such arrangements may include different types of objects placed at different distances from the LiDAR system 310. Also, the illustrated values of normalized average power of the reflected test optical pulse 504 merely represent examples and not actual values. Such examples are based on the fact that a metallic type test object 508 may have a higher reflectivity coefficient as compare to a plastic type test object 508. Hence the reflected test optical pulse 504 reflected from a metallic type test object 508 may have more power as compared to the reflected test optical pulse 504 reflected from a plastic type test object 508. Also, the power of the reflected optical pulse 504 may decrease with increase in distance between the LiDAR system 310 and the test object 508.

Returning to FIG. 3, where the LiDAR system 310 is being operated under in-use. As previously mentioned, the LiDAR system 310 may transmit the transmitted optical pulse 412 towards the object 330. The transmitted optical pulse 412 after contacting the object 330 may thus be reflected as the reflected optical pulse 414 towards LiDAR system 310. The LiDAR system 310 may provide the reflected optical pulse 414 to the receiver component 318. The receiver 318 may be configured to generate the electrical pulse 422 that is representative of the reflected optical pulse 414.

The ADC 402 may convert the electrical pulse 422 into series of discrete digital values 431, including the discrete digital values 432, 434, and 436. The ADC 402 may provide the series of discrete values 431 to the processor 404. The processor 404 may also access the pre-populated library 700 stored in the memory 406 in order to retrieve a resolution parameter. In so doing, the processor 404 may determine a similarity parameter between the series of discrete digital values 431 and each of the template pulse profile associated with the template pulse profiles 600. It is to be noted that, in certain embodiments, prior to accessing the pre-populated library 700, the processor 404 may be configured to populate the library 700 as explained above.

In certain embodiments, in order to determine the similarity parameter, the processor 404 may compare all of discrete digital values 432, 434, and 436 from the series of discrete digital values 431 against all of the discrete digital values from the series of discrete digital values associated a respective template pulse profile from the list of template pulse profiles 600. While preforming the comparison operation, the processor 404 may sequentially process all of the template pulse profiles in the list of template pulse profiles 600. To this end, in certain embodiments the processor 404 may be configured to compute a correlation parameter determining the similarity parameter between the series of discrete digital values 431 and each of the template pulse profile associated with the template pulse profiles 600. In other embodiments, the processor 404 may be configured to implement a method of least mean square error for determining the similarity parameter between the series of discrete digital values 431 and each of the template pulse profile associated with the template pulse profiles 600.

In certain embodiments, the processor 404 may retrieve a resolution parameter from the library 700 corresponding to the template pulse profile among at least some of the template pulse profiles in the list of template pulse profiles 600 having a highest similarity parameter. The processor 404 may utilize the retrieved resolution parameter to determine the distance of the object 330 from the LiDAR system 310. For instance, if the template pulse profile 604 has the highest similarity parameter corresponding to the series of discrete digital values 431, including discrete digital values 432, 434, and 436 then the processor 404 may retrieve the time and/or distance compensation resolution parameters from the library 700. Since in one example, the template pulse profile 604 corresponds to a type of material of the test object 508 being plastic positioned at 46 cm from the LiDAR system 310, the associated time compensation resolution parameters may include the respective time values −0.933 ns, −0.433 ns, and +0.067 ns. Also, the distance compensation resolution parameters may include the respective distance values −14 cm, −6.5 cm, and +1 cm. Using at least one of the time value associated with the time compensation resolution parameters and/or at least one of the distance value associated with the distance compensation resolution parameters, the processor 404 may determine the distance of the object 330 from the LiDAR system 310.

It will be appreciated that the time values associated with the time compensation resolution parameters may be added to or subtracted from the calculated respective time instants such as near start, near peak or near end depending on the time values associated with the time compensation resolution parameters. For example, if the associated time value is negative, it is subtracted from the calculated respective time instant and if the associated time value is positive, it is added to the calculated respective time instant.

Similarly, the distance values associated with the distance compensation resolution parameters may be added to or subtracted from the calculated respective distance of the object 330 from the LiDAR system 310. For example, if the associated distance value is negative, it is subtracted from the calculated distance of the object 330 from the LiDAR system 310 and if the associated distance value is positive, it is added to the calculated distance of the object 330 from the LiDAR system 310.

In certain embodiments, the processor 404 may also retrieve the type of the material of the test object 508 associated with the template pulse profile having a highest similarity parameter. It is to be noted that, in certain non-limiting embodiments, the processor 404, while computing the similarity parameter may also utilizes the normalized average power associated with the series of discrete digital values 431. As such, the processor 404 may compare the profile of the series of discrete digital values 431 with the profiles in the template pulse profiles 600 along with the computed normalized average power with the normalized average powers stored in the library 700 to further determine the type of the material of the test object 508.

In certain non-limiting embodiments of the present technology, the processor 404 may further employ a machine learning algorithm (MLA) having been trained to predict the highest similarity parameter and the type of the test object 508 based on the list of template pulse profiles 600 and the associated records stored in the library 700.

In certain embodiments, the list of template pulse profiles 600 and the associated records stored in the library 700 may be provided as training inputs to the MLA. In certain non-limiting embodiments, the list of template pulse profiles 600 including various digital discrete digital values and the associated records may be provided to a suitable MLA such as, as an input to a feed-forward or convolutional neural network (CNN). In so doing, the CNN may provide resolution parameters corresponding to the highest similarity parameter and the type of test object 508 as labels based on the training inputs. Once the MLA is trained to predict the labels, the MLA is used to generate improved predictions of the highest similarity parameter and the type of object 330.

In certain non-limiting embodiments of the present technology, the LiDAR system 310 may be communicatively coupled to the vehicle 220. As such, the vehicle 220 may be implemented as a SDC. The processor 404 associated with the LiDAR system 310 may be configured to control the operation of the vehicle 220 based on the computed distance 390 of the object 330 from the LiDAR system 310. In certain embodiments, the controlling operation of the vehicle 220 by the processor 404 may be based on retrieved type of the test object 508. Such controlling operations may include but are not limited to acceleration, braking, stopping, changing lane and self-parking or the like.

Figure 12:
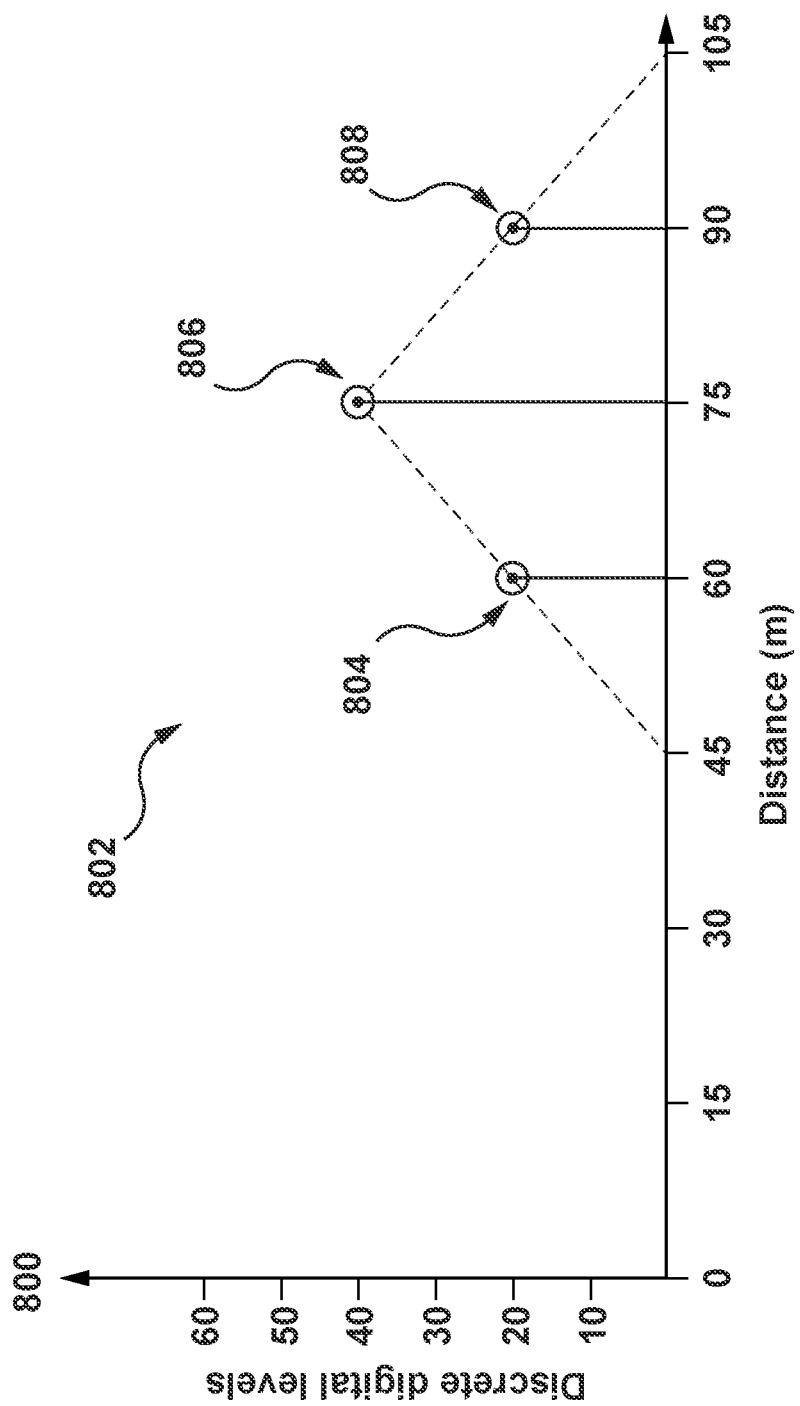
FIG. 12 illustrates a representation of series of discrete digital values including discrete digital values corresponding to distance associated with the reflected optical during in-use conditions, in accordance to a specific non-limiting embodiment of the present technology.

FIG. 12 illustrates a representation 800 of series of discrete digital values 802 including discrete digital values 804, 806 and 808 corresponding to distance associated with the reflected optical during in-use conditions, in accordance to a specific non-limiting embodiment of the present technology. It will be appreciated that although series of discrete digital values 802 includes three discrete digital values however, in various non-limiting embodiments, based on duration of transmitted and reflected optical pulses and the clock frequency with which the LiDAR system 310 and its components are being operated, the number of discrete digital values and series of discrete digital values 802 may be much more than three.

In certain embodiments, the representation 800 of series of discrete digital values 802 including discrete digital values 804, 806 and 808 are corresponding to in-use condition. For example, the vehicle 220 is on the road and the associated LiDAR system 310 scans for an in-use object in the vicinity of the vehicle 220. On identifying the in-use object on the road, the LiDAR system 310 may generate the representation 800 of series of discrete digital values 802 including discrete digital values 804, 806 and 808 using the technology discussed in the present disclosure.

The LiDAR system 310 then accesses the library 700 to determine the time compensation resolution parameters and/or the distance compensation resolution parameters. In so doing, the LiDAR system 310 may compare the entirety of series of discrete digital values 802 with entirety of each of the template pulse profile in the template pulse profiles 600 to identify the similarity parameters.

Such comparison may include computing correlation between the entirety of series of discrete digital values 802 and entirety of each of the template pulse profile in the template pulse profiles 600. In certain non-limiting embodiments, along with computing the correlation, the processor 404 may also compare the normalized average power of the series of discrete digital values 802 with the normalized average power associated with the each of the template pulse profile in the template pulse profiles 600. Based on such comparisons, the LiDAR system 310 identifies that the template pulse profile 604 has the highest similarity parameter, retrieves the time compensation resolution parameter and/or the distance compensation resolution parameter and determine the distance of the in-use object from the LiDAR system 310 as 47 cm. Also, the type of material of the in-use object is determined as plastic.

Computer-Implemented Methods

Figure 13:
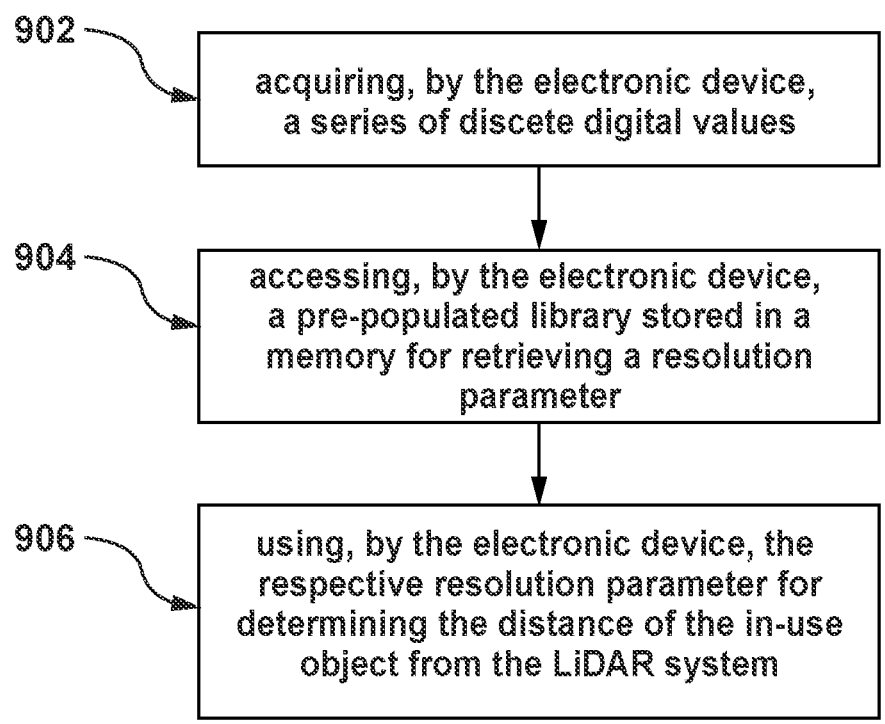
FIG. 13 illustrates a flowchart of a method for determining distance to an object from the LiDAR system, in accordance with various non-limiting embodiments of the present technology.

Now turning to FIG. 13, a flowchart of a method 900 for determining distance to the object 330 from the LiDAR system 310, in accordance with various non-limiting embodiments of the present technology.

In some non-limiting embodiments of the present technology, the method 900 may be implemented by the controller component 320 communicatively connected to the LiDAR system 310. As previously discussed that in at least some non-limiting embodiments of the present technology, the controller component 320 nay include one or more processors and may be implemented in a similar manner to the electronic device 210 and/or the computer system 100, without departing from the scope of the present technology. The method 900 begins at step 902.

Step 902: acquiring, by the electronic device, a series of discrete digital values.

At step 902, the ADC 402 converts the electrical pulse 422 into series of discrete digital values 431, including discrete digital values 432, 434, and 436. The ADC 402 may provide the series of discrete values, for example 432, 434, and 436 to the processor 404. As such, the series of discrete digital values 431 may be a representative of the transmitted optical pulse 412 after striking the object 330 may be reflected as the reflected optical pulse 414 towards LiDAR system 310.

Step 904: accessing, by the electronic device, a pre-populated library stored in a memory for retrieving a resolution parameter.

At step 904, the processor 404 accesses the pre-populated library 700 stored in the memory 406. As previously noted that the pre-populated library 700 may include the template pulse profiles 600. Also, each of the template pulse profile of the template pulse profiles 600 may be associated in the pre-populated library 700 with a respective test object 508, a respective resolution parameter, and a type material of the respective test object 508 from a plurality of types of material, such as, plastic, rubber, metal, concrete or the like.

The accessing of the pre-populated library 700 by the processor 404 includes determining the similarity parameter between the series of discrete digital values 431 and each of the template pulse profile associated with the template pulse profiles 600. Further, the processor 404 retrieves the resolution parameter of the template pulse profile from the list of template pulse profiles 600 having the highest similarity parameter. As such the resolution parameter may include a temporal value and/or a distance value.

Step 906: using, by the electronic device, the respective resolution parameter for determining the distance of the in-use object from the LIDAR system.

At step 906, the processor 404 uses the retrieved resolution parameter to determine the distance 390 of the object 330 from the LiDAR system 310. In so doing, the processor 404 may adjust the calculated distance corresponding to the temporal value or the distance value associated with the resolution parameter.

In one or more non-limiting steps associated with the method 900, retrieving of resolution parameter may be based on one or more of the correlation method, least mean square method, and a machine learning algorithm (MLA).

In one or more non-limiting steps associated with the method 900, the processor 404 populates the library 700 corresponding to the given test object 508 being of a given type of a material such as plastic, rubber, metal, concrete or the like. As such, the test object 508 may be located at a pre-determined distance. The processor 404 may acquire a respective template pulse profile, for example 602, of the reflected test optical pulse 504. Further, the processor 404 may determine the resolution parameter for the respective template pulse profile, for example 602 based on the pre-determined distance. Once the processor 404 determines the resolution parameter, the processor 404 may populate the library 700 with a record for the respective template pulse profile, for example 602. As such, the associated record may indicate the respective template pulse profile, for example 602, the given type of the given test object 508, and the resolution parameter.

It should be apparent to those skilled in the art that at least some embodiments of the present technology aim to improve a resolution of technical solutions for addressing a particular technical problem, namely improving performance of a LiDAR system while reducing the hardware burden imposed on various LiDAR systems by incorporating and accessing a pre-populated library 700 for retrieving and a resolution parameter and using the resolution parameter to determine a distance between the object 330 and the LiDAR system.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

While the above-described implementations have been described and shown with reference to particular steps performed in a particular order, it will be understood that these steps may be combined, sub-divided, or re-ordered without departing from the teachings of the present technology. Accordingly, the order and grouping of the steps is not a limitation of the present technology.

The invention claimed is:

1. A computer-implemented method of determining a distance of an object from a LiDAR system, the object being of a type, the type being one of a plurality of types of objects, the LiDAR system being communicatively coupled to an electronic device, the method executable by the electronic device, the method comprising:
acquiring, by the electronic device, a series of discrete digital values,
the series of discrete digital values being representative of an optical return pulse,
the optical return pulse corresponding to an optical output pulse (i) having been emitted by the LiDAR system and (ii) having returned to the LiDAR system after contacting the object;
accessing, by the electronic device, a pre-populated library stored in a memory for retrieving a resolution parameter for the object,
the library including a list of template pulse profiles, a given one of the list of template pulse profiles being associated in the library with a respective test object, a respective resolution parameter of the respective test object, and a type of the respective test object from the plurality of types;
the accessing including:
determining, by the electronic device, similarity parameters between (i) the series of discrete digital values and (ii) respective ones of the list of template pulse profiles;
a given similarity parameter being determined between (i) the series of discrete digital values and (i) a respective template pulse profile from the list of template pulse profiles;
retrieving, by the electronic device from the library, at least the respective resolution parameter of the template pulse profile having a highest similarity parameter; and
using, by the electronic device, the respective resolution parameter of the template pulse profile having the highest similarity parameter for determining the distance of the object from the LiDAR system.

2. The method of claim 1, wherein the determining the similarity parameter comprises:
comparing, by the electronic device, the series of discrete values against a totality of the given template pulse profile.

3. The method of claim 1, wherein the determining the similarity parameter comprises:
employing, by the electronic device, a correlation method for determining the similarity parameter.

4. The method of claim 1, wherein the determining the similarity parameter comprises:
employing, by the electronic device, a least mean square error method for determining the similarity parameter.

5. The method of claim 1, wherein the electronic device is communicatively coupled to a Self-Driving Car (SDC).

6. The method of claim 5, wherein the method further comprises:
controlling, by the electronic device, operation of the SDC based on the distance of the object from the LiDAR system.

7. The method of claim 6, wherein the retrieving at least the resolution parameter further comprises:
retrieving, by the electronic device, the type of the respective test object of the template pulse profile having a highest similarity parameter,
and wherein the controlling the operation of the SDC by the electronic device is further based on the type of the respective test object.

8. The method of claim 1, wherein the series of discrete digital values is generated by an analog-to-digital (ADC) converter having a pre-determined temporal resolution.

9. The method of claim 8, wherein the pre-determined temporal resolution is 1 nanosecond.

10. The method of claim 1, wherein the method further comprises, prior to the acquiring the series of discrete digital values:
populating, by the electronic device, the pre-populated library.

11. The method of claim 10, wherein the populating comprises:
for a given test object of a given type,
acquiring, by the electronic device, a respective template pulse profile of a test optical return pulse,
the test optical return pulse corresponding to an test optical output pulse (i) having been emitted by the LIDAR system and (ii) having returned to the LIDAR system after contacting the given test object located at a pre-determined distance from the LIDAR system;
determining, by the electronic device, the resolution parameter for the test optical return pulse based on the pre-determined distance;
populating, by the electronic device, the library with a record for the respective template pulse profile, the record being indicative of (i) the respective template pulse profile, (ii) the given type of the given test object, and (iii) the resolution parameter.

12. The method of claim 1, wherein the resolution parameter is one of a temporal value and a distance value.

13. The method of claim 12, wherein the resolution parameter is the temporal value, and wherein the temporal value is a difference between (i) a moment in time corresponding to an expected peak value of the respective template pulse profile and (ii) a moment in time corresponding to a measured peak value of the respective template pulse profile.

14. The method of claim 12, wherein the using the respective resolution parameter comprises:
using, by the electronic device, the temporal value for determining a time of flight of the optical return pulse.

15. The method of claim 1, further comprising training a Machine Learning Algorithm to predict the highest similarity parameter based on the list of template pulse profiles and associated records stored in the library.

16. The method of claim 1, further comprising training a Machine Learning Algorithm to predict the type of the test object based on the list of template pulse profiles and associated records stored in the library.

17. An electronic device for determining distance of an object from a LiDAR system, the object being of a type, the type being one of a plurality of types of objects, the LiDAR system being communicatively coupled to the electronic device, the electronic device configured to:
acquire a series of discrete digital values,
the series of discrete digital values being representative of an optical return pulse,
the optical return pulse corresponding to an optical output pulse (i) having been emitted by the LiDAR system and (ii) having returned to the LiDAR system after contacting the object;
access a pre-populated library stored in a memory for retrieving a resolution parameter for the object,
the library including a list of template pulse profiles,
a given one of the list of template pulse profiles being associated in the library with a respective test object, a respective resolution parameter of the respective test object, and a type of the respective test object from the plurality of types;
the accessing including:
determining similarity parameters between (i) the series of discrete values and (ii) respective ones of the list of template pulse profiles,
a given similarity parameter being determined between (i) the series of discrete values and (i) a respective template pulse profile from the list of template pulse profiles;
retrieving from the library, at least the respective resolution parameter of the template pulse profile having a highest similarity parameter; and
use the respective resolution parameter of the template pulse profile having the highest similarity parameter for determining the distance of the object from the LiDAR system.

18. The electronic device of claim 17, wherein the electronic device is configured to determine the given similarity parameter by comparing the series of discrete values against a totality of the respective template pulse profile.

19. The electronic device of claim 17, wherein the electronic device is configured to determine the given similarity parameter by employing a correlation method or a least mean square error method.

20. The electronic device of claim 17, wherein the series of discrete digital values is generated by an analog-to-digital (ADC) converter having a pre-determined temporal resolution.

* * * * *